United States Patent
Ohsaki et al.

(10) Patent No.: US 11,499,034 B2
(45) Date of Patent: Nov. 15, 2022

(54) FILM COMPRISING HYDROPHOBIZED CELLULOSE FIBERS AND OIL

(71) Applicant: KAO CORPORATION, Tokyo (JP)

(72) Inventors: Kouji Ohsaki, Wakayama (JP);
Yoshinori Hasegawa, Wakayama (JP);
Takuma Tsuboi, Sakai (JP)

(73) Assignee: KAO CORPORATION, Tokyo (JP)

( * ) Notice: Subject to any disclaimer, the term of this patent is extended or adjusted under 35 U.S.C. 154(b) by 303 days.

(21) Appl. No.: 16/491,998

(22) PCT Filed: Mar. 6, 2018

(86) PCT No.: PCT/JP2018/008618
§ 371 (c)(1),
(2) Date: Sep. 6, 2019

(87) PCT Pub. No.: WO2018/164135
PCT Pub. Date: Sep. 13, 2018

(65) Prior Publication Data
US 2020/0071491 A1 Mar. 5, 2020

(30) Foreign Application Priority Data
Mar. 7, 2017 (JP) .............................. JP2017-043304

(51) Int. Cl.
*C08L 1/02* (2006.01)
*C08L 91/00* (2006.01)
*C08J 5/18* (2006.01)

(52) U.S. Cl.
CPC . *C08L 1/02* (2013.01); *C08J 5/18* (2013.01); *C08L 91/005* (2013.01); *C08L 2201/56* (2013.01); *C08L 2203/16* (2013.01); *C08L 2205/16* (2013.01)

(58) Field of Classification Search
CPC ...... C08L 1/02; C08L 91/005; C08L 2201/56; C08L 2203/16; C08L 2205/16; C08J 5/18
See application file for complete search history.

(56) References Cited

U.S. PATENT DOCUMENTS

| | | | |
|---|---|---|---|
| 5,576,049 A | 11/1996 | Haas et al. | |
| 5,849,152 A | 12/1998 | Arnold et al. | |
| 2005/0100518 A1 | 5/2005 | Ilekti et al. | |
| 2011/0177143 A1 | 7/2011 | Tamura et al. | |
| 2013/0022827 A1 | 1/2013 | Imai et al. | |
| 2013/0345415 A1 | 12/2013 | Trigiante | |
| 2015/0376535 A1 | 12/2015 | Shiratori et al. | |
| 2020/0071491 A1 | 3/2020 | Ohsaki et al. | |

FOREIGN PATENT DOCUMENTS

| | | | |
|---|---|---|---|
| JP | 5-255401 A | | 10/1993 |
| JP | 8-504452 A | | 5/1996 |
| JP | 11-512467 A | | 10/1999 |
| JP | 2007-527861 A | | 10/2007 |
| JP | 2008-308524 A | | 12/2008 |
| JP | 2010-59408 A | | 3/2010 |
| JP | 2010-100612 A | | 5/2010 |
| JP | 2010-156068 A | | 7/2010 |
| JP | 2011-79742 A | | 4/2011 |
| JP | 2013-82796 A | | 5/2013 |
| JP | 2015-533186 A | | 11/2015 |
| JP | 2015-533858 A | | 11/2015 |
| JP | 2016-11375 A | | 1/2016 |
| JP | 2017-14116 A | | 1/2017 |
| JP | 2017014116 A | * | 1/2017 |
| JP | 2017-57879 A | | 3/2017 |
| JP | 2018-44095 A | | 3/2018 |
| TW | I755494 B | | 2/2022 |
| WO | WO 2011/118360 A1 | | 9/2011 |

OTHER PUBLICATIONS

Extended European Search Report for European Application No. 18764409.1, dated Nov. 20, 2020.
Fujisawa et al., "Surface Engineering of Ultrafine Cellulose Nanofibrils toward Polymer Nanocomposite Materials," Biomacromolecules, vol. 14, 2013, pp. 1541-1546.
Sun et al., "Oil-in-water emulsions stabilized by hydrophobically modified hydroxyethyl cellulose: Adsorption and thickening effect," Journal of Colloid and Interface Science, vol. 311, 2007 (published online Mar. 3, 2007), pp. 228-236.
Japanese Office Action for Japanese Application No. 2018-039880, dated Sep. 27, 2021.
International Search Report for International Application No. PCT/JP2018/008618, dated May 22, 2018.
Taiwanese Notice of Allowance and Search Repon issued in the corresponding Taiwanese Patent Application No. 111104674 dated Sep. 8, 2022.

* cited by examiner

Primary Examiner — Robert D Harlan
(74) Attorney, Agent, or Firm — Birch, Stewart, Kolasch & Birch, LLP

(57) ABSTRACT

The present invention relates to a film comprising hydrophobically modified cellulose fibers in which cellulose fibers are bound to a modifying group at one or more members selected from anionic groups and hydroxyl groups, and an oil having an SP value of 10 or less. The film of the present invention can be utilized in the fields of materials for packaging containers for cosmetics and foods.

15 Claims, No Drawings

FILM COMPRISING HYDROPHOBIZED CELLULOSE FIBERS AND OIL

FIELD OF THE INVENTION

The present invention relates to a film comprising hydrophobically modified cellulose fibers and an oil.

BACKGROUND OF THE INVENTION

Conventionally, in the fields of package containers for cosmetics, foods, etc., and the like, surface films for inhibiting depositions of subjects and soils have been developed. Recently, a water-slidable, oil-slidable film characterized in that the film comprises a fibrous polymer that forms a backbone of a three-dimensional entangled network structure, and has a continuous porous structure as the empty space of the network structure, and a slippery liquid infused in the internal of the pores of the porous polymer film has been known (Patent Publication 1). In Patent Publication 1, a fluorine-based oil or a silicone oil is exemplified as the slippery liquid (claim 7).

Patent Publication 1: Japanese Patent Laid-Open No. 2016-011375

SUMMARY OF THE INVENTION

The present invention relates to the following [1] to [4]:
[1] A film comprising
hydrophobically modified cellulose fibers in which cellulose fibers are bound to a modifying group at one or more members selected from anionic groups and hydroxyl groups, and an oil having an SP value of 10 or less.
[2] A molded article comprising a film as defined in the above [1].
[3] A method for forming a film on a molded article, comprising step 1: preparing a dispersion containing hydrophobically modified cellulose fibers and an oil having an SP value of 10 or less, and step 2: applying the dispersion prepared in the step 1 to a molded article.
[4] A dispersion for a film, comprising
hydrophobically modified cellulose fibers in which cellulose fibers are bound to a modifying group at one or more members selected from anionic groups and hydroxyl groups, and
an oil having an SP value of 10 or less.

DETAILED DESCRIPTION OF THE INVENTION

In the technique of Patent Publication 1, an oil constituting a surface film undesirably migrates to a subject, whereby consequently risking impairments of the effects of inhibiting, depositions of soils or the like on a surface film. Such phenomena are particularly notably caused in a case where the subject (fluid) contains an oily component.

The present invention relates to a film having small migration properties of an oil constituting a surface film to a fluid, so that the effects of inhibiting depositions of the fluid can be maintained for a long period of time. Further, the present invention relates to a method for forming a film on a molded article. Further, the present invention relates to a molded article which can maintain the effects of inhibiting depositions of a fluid for a long period of time. Further, the present invention relates to a dispersion for the film.

The film of the present invention has small migration properties of an oil constituting a surface film to a fluid, so that the effects of inhibiting depositions of the fluid can be maintained for a long period of time. Further, since the molded article of the present invention comprises a film of the present invention, higher effects of inhibiting depositions of the fluid can be maintained for a long period of time. Further, according to a method for forming a film on a molded article of the present invention, a film as described above can be formed on the molded article.

[Film]

The film of the present invention contains specified hydrophobically modified cellulose fibers and an oil having an SP value of 10 or less. Here, a film refers to a film that holds its shape without flowing at room temperature. As a surface hardness of the film, for example, when measured by a microhardness tester, a film having a Martens hardness (HM) as calculated by the following formula:

$$HM = F/(26.43 \times hmax^2)$$

wherein F is a testing force, N, and
hmax is a maximum depth of indentation, mm
of 0.1 N/mm² or more is preferred. Specifically, the Martens hardness of the film is measured in accordance with a method described in Examples set forth below.

Although the mechanisms are not certain for which the film of the present invention has small migration properties of an oil constituting a surface film to a fluid, so that the effects of inhibiting depositions of the fluid can be maintained for a long period of time, they are assumed as follows. Since an oil having an SP value of 10 or lower has higher hydrophobicity than an oil having an SP value exceeding 10, the oil having an SP value of 10 or less is considered to have strengthened the affinity with the hydrophobically modified cellulose fibers. As a result, the oil having an SP value of 10 or less would not be easily separated from the hydrophobically modified cellulose fibers, so that it is assumed that the oil would less likely to migrate to a fluid even when an oily component is contained in the fluid.

The higher the smoothness of the film of the present invention, the more preferred because the slippery surface properties become high. Specifically, the arithmetic mean roughness of the film is preferably 0.3 μm or more, more preferably 0.5 μm or more, and even more preferably 0.8 μm or more, from the viewpoint of costs versus effects, and on the other hand, the arithmetic mean roughness is preferably 40 μm or less, more preferably 35 μm or less, and even more preferably 30 μm or less, from the viewpoint of the slippery surface properties. Here, the arithmetic mean roughness of the film can be measured in accordance with a method described in Examples set forth below.

The thickness of the film of the present invention is, but not particularly limited to, preferably 1 μm or more, more preferably 3 μm or more, and even more preferably 5 μm or more, from the viewpoint of durability of the film, and the thickness is preferably 2,000 μm or less, more preferably 1,200 μm or less, even more preferably 500 μm or less, and even more preferably 100 μm or less, from the viewpoint of economic advantages. Here, the thickness of the film can be provided to have a desired value by setting a coating thickness of a coating tool such as an applicator, or adjusting a proportion of a solvent in a dispersion.

<Slippery Surface Film>

It is preferable that the film of the present invention shows slippery surface properties shown in a publication (*Chouhassui Chouhatsuu Katsueki-sei Hyomen-no Gijutsu (Technologies of Super-Water-Repellent, Super Oil-Repellent Slippery Surfaces)*; published by H. MOTOKI, publisher: Science & Technology K.K.; published on Jan. 28, 2016).

The film which exhibits the slippery surface properties as used herein is also referred to as "a slippery surface film."

The slippery surface properties can be measured, for example, by a method described in an article *Nature* 2011, 477, 443-447. Specifically, the slippery surface properties can be evaluated by dropping 2 μL of liquid droplets at 20° C. to a slippery surface, allowing the liquid droplets to stand for 10 seconds, then slanting the surface at a rate of 1°/s, and measuring an angle at which the liquid droplets start flowing, which is hereinafter also referred to as sliding angle, at room temperature of 20° C. For example, in a case where dodecane is used as liquid droplets in the above measurement method, the sliding angle in the slippery surface film is preferably 80° or less, more preferably 50° or less, and even more preferably 40° or less, from the viewpoint of exhibiting the slippery surface properties.

Since the film of the present invention has high effects of inhibiting depositions of the fluid, the film can be used as a slippery surface film for, for example, modifying a solid surface to a slippery surface.

The applications of the film of the present invention include, for example, internal surface materials for package containers for cosmetics, foods, and the like, pipes for transportation, coating materials for ship-bottoms and electric wires, and the like.

One of the features of the film of the present invention is in having high effects of inhibiting depositions of the fluid. Specifically, the sliding rate is preferably 1.5 cm/minute or more, more preferably 2.0 cm/minute or more, and even more preferably 2.5 cm/minute or more. Further, the sliding rate at a fifth measurement is preferably 1.5 cm/minute or more, more preferably 2.0 cm/minute or more, and even more preferably 2.5 cm/minute or more, from the viewpoint of durability of the effects of inhibiting depositions of the fluid. Here, the sliding rate can be measured in accordance with a method described in Examples set forth below.

One of the features of the film of the present invention is in that the migration properties of the oil having an SP value of 10 or less to the fluid are small. Since the migration properties are small, the film can be maintained for a longer period of time, whereby consequently the effects of inhibiting depositions can also be exhibited for an even longer period of time. Specifically, the migration ratio of the lubrication oil is preferably 10.0% or less, more preferably 7.5% or less, even more preferably 5.0% or less, and even more preferably 0%. Here, the migration ratio of the lubrication oil can be measured in accordance with a method described in Examples set forth below.

<Fluid>

The fluid in the present invention refers to a substance for packaging subjects or coating subjects for, for example, cosmetics or foods themselves. The fluid of which deposition can be inhibited in the film of the present invention is not particularly limited. The viscosity of the fluid is preferably 0.1 mPa·s or more, more preferably 0.5 mPa·s or more, and even more preferably 0.8 mPa·s or more, from the viewpoint of easily exhibiting the effects of the present invention, and the viscosity is preferably 100,000 mPa·s or less, more preferably 80,000 mPa·s or less, and even more preferably 50,000 mPa·s or less, from the same viewpoint. Here, the viscosity of the fluid can be measured by an E-type viscometer, 25° C., 1 rpm, after 1 minute, standard cone rotor, rotor code: 01.

In addition, the surface tension of the fluid is preferably 15 mN/m or more, more preferably 18 mN/m or more, and even more preferably 20 mN/m or more, from the viewpoint of easily exhibiting the effects of the present invention, and the surface tension is preferably 75 mN/m or less, from the same viewpoint. Here, the surface tension of the fluid can be measured by a plate method (Wilhelmy method).

<Hydrophobically Modified Cellulose Fibers>

The hydrophobically modified cellulose fibers in the present invention may be ones in which cellulose fibers are bound to a modifying group at one or more members selected from anionic groups and hydroxyl groups, which show dispersibility in an oil having an SP value of 10 or less. Those having dispersibility in the oil having an SP value of 10 or less refer to that, for example, when a viscosity of a liquid mixture of an oil and subject hydrophobically modified cellulose fibers is measured using an E-type viscometer, 25° C. 1 rpm, after 1 minute, standard cone rotor, rotor code: 01, an increased viscosity is observed. For example, as the hydrophobically modified cellulose in the present invention, those having a viscosity of a dispersion after a finely fibrillating treatment of a liquid prepared so as to have a concentration of cellulose fibers in squalane of 0.5% by mass as a representative example of an oil having an SP value of 10 or less of 50 mPa·s or more are preferred. Here, the finely fibrillating treatment can be carried out by a method described later.

The crystallinity of the hydrophobically modified cellulose fibers is preferably 10% or more, from the viewpoint of exhibiting the slippery surface properties. In addition, the crystallinity is preferably 90% or less, from the viewpoint of availability of the raw materials. The crystallinity of the cellulose as used herein is a cellulose I crystallinity calculated from diffraction intensity values according to X-ray diffraction method, which can be measured in accordance with a method described in Examples set forth below. Here, cellulose I is a crystalline form of a natural cellulose, and the cellulose I crystallinity means a proportion of the amount of crystalline region that occupies the entire cellulose. The presence or absence of the cellulose I crystal structure can be judged by the presence of a peak at $2\eta=22.6°$ in the X-ray diffraction measurement.

The preferred ranges of the average fiber diameter, the average fiber length, and the average aspect ratio of the hydrophobically modified cellulose fibers are the same as the preferred ranges of the average fiber diameter, the average fiber length, and the average aspect ratio of the fine cellulose fibers described later, from the viewpoint of the slippery surface properties and the inhibition of migration of the oil to the fluid. In addition, they can be obtained in accordance with the measurement methods described in Examples set forth below.

The amount of the hydrophobically modified cellulose fibers in the film of the present invention is, but not particularly limited to, preferably 1% by mass or more, more preferably 3% by mass or more, and even more preferably 4% by mass or more, from the viewpoint of the slippery surface properties and the durability of the film, and the amount is preferably 40% by mass or less, more preferably 35% by mass or less, and even more preferably 30% by mass or less, from the same viewpoint.

The hydrophobically modified cellulose fibers include, for example, hydrophobically modified cellulose fibers (A) in which cellulose fibers having an anionic group, which are also hereinafter referred to as "anionically modified cellulose fibers," are bound to a modifying group at the anionic group; and hydrophobically modified cellulose fibers (B) in which cellulose fibers are ether-bound to a modifying group at a hydroxyl group of the surface, which is also hereinafter referred to as "etherified cellulose fibers." Preferred are the hydrophobically modified cellulose fibers (A), from the viewpoint of being even more capable of exhibiting the effects of the present invention.

(Cellulose Fibers)

The raw material cellulose fibers for the hydrophobically modified cellulose fibers are preferably natural cellulose fibers, from the environmental viewpoint, and the natural cellulose fibers include, for example, those from wooden pulp such as pulp from needle-leaf trees and pulp from broad-leaf trees; cotton pulp from cotton linter and cotton lint; non-wooden pulp such as maize straw pulp and bagasse pulp; bacteria cellulose; and the like. These natural cellulose fibers can be used alone or in a combination of two or more kinds.

The average fiber diameter of the raw material cellulose fibers is, but not particularly limited to, preferably 1 μm or more, more preferably 5 μm or more, and even more preferably 15 μm or more, and on the other hand preferably 300 μm or less, more preferably 100 μm or less, and even more preferably 60 μm or less, from the viewpoint of handling property and costs.

In addition, the average fiber length of the raw material cellulose fibers is, but not particularly limited to, preferably 100 μm or more, more preferably 500 μm or more, and even more preferably 1,000 μm or more, and preferably 5,000 μm or less, more preferably 4,000 μm or less, and even more preferably 3,000 μm or less, from the viewpoint of availability and costs. The average fiber diameter and the average fiber length of the raw material cellulose fibers can be measured in accordance with the methods described in Examples set forth below.

<Hydrophobically Modified Cellulose Fibers (A)>

The hydrophobically modified cellulose fibers (A) in the present invention refer to cellulose fibers in which anionically modified cellulose fibers are bound to a compound for introducing a modifying group at an anionic group.

(Anionically Modified Cellulose Fibers)

The anionic group contained in the anionically modified cellulose fibers includes, for example, a carboxy group, a sulfonate group, a phosphate group, and the like, and a carboxy group is preferred, from the viewpoint of the introduction efficiency to the cellulose fibers. The ions, counterions, constituting a pair with an anionic group in the anionically modified cellulose fibers include, for example, metal ions which are formed in the presence of an alkali during the production, such as sodium ions, potassium ions, calcium ions, and aluminum ions, and protons generated by substituting these metal ions with an acid, and the like.

(Content of Anionic Group)

The content of the anionic group in the anionically modified cellulose fibers usable in the present invention is preferably 0.1 mmol/g or more, more preferably 0.4 mmol/g or more, even more preferably 0.6 mmol/g or more, and even more preferably 0.8 mmol/g or more, from the viewpoint of the introduction of a modifying group. In addition, the content is preferably 3 mmol/g or less, more preferably 2 mmol/g or less, and even more preferably 1.8 mmol/g or less, from the viewpoint of improving handling property. Here, the "content of anionic group" means a total amount of anionic groups in the cellulose constituting the cellulose fibers, which is specifically measured in accordance with a method described in Examples set forth below.

In addition, the preferred ranges of the average fiber diameter, the average fiber length, and the average aspect ratio of the anionically modified cellulose fibers are the same as the preferred ranges of the average fiber diameter and the average fiber length of the fine cellulose fibers described later. In addition, they can be obtained in accordance with the measurement methods described in Examples set forth below.

(Step of Introducing Anionic Group)

The anionically modified cellulose fibers usable in the present invention can be obtained by subjecting cellulose fibers to be treated to an oxidation treatment or an addition treatment of an anionic group to introduce one or more anionic groups to be anionically modified.

The cellulose fibers which are to be treated with anionic modification include raw material cellulose fibers. It is preferable to use cellulose fibers which are raw material cellulose fibers subjected to an alkali hydrolysis treatment or an acid hydrolysis treatment or the like to treat for shortening fibers so as to have an average fiber length of 1 μm or more and 1,000 μm or less, from the viewpoint of the dispersibility.

It is described more specifically hereinbelow, separately to (i) a case where cellulose fibers are introduced with a carboxy group as an anionic group, and (ii) a case where cellulose fibers are introduced with a sulfonate group or a phosphate group as an anionic group.

(i) A Case Where Cellulose Fibers are Introduced with a Carboxy Group as an Anionic Group The method for introducing a carboxy group as an anionic group to cellulose fibers includes, for example, a method of oxidizing a hydroxyl group of cellulose to convert the hydroxyl group to a carboxy group; and a method of treating at least one member selected from the group consisting of compounds having a carboxy group, acid anhydrides of compounds having a carboxy group, and derivatives thereof with a hydroxyl group of cellulose.

(Oxidized Cellulose Fibers)

The cellulose fibers having a carboxy group as used herein are referred to as "oxidized cellulose fibers." The oxidized cellulose fibers can be produced by, for example, using, as a catalyst, 2,2,6,6,-tetramethyl-1-piperidine-N-oxyl (TEMPO), further together with an oxidizing agent such as sodium hypochlorite or a bromide such as sodium bromide, thereby applying a method of oxidizing a hydroxyl group of the cellulose fibers to a carboxy group. More specifically, a method described in Japanese Patent Laid-Open No. 2011-140632 can be referred, and further an additional oxidation treatment or a reduction treatment is carried out, whereby oxidized cellulose fibers in which an aldehyde is removed can be prepared. The oxidized cellulose fibers are preferred, as compared to other anionically modified cellulose fibers, from the viewpoint of inhibiting the migration of the oil to the fluid.

(ii) A Case Where Cellulose Fibers are Introduced with a Sulfonate Group or a Phosphate Group as an Anionic Group The method of introducing a sulfonate group as an anionic group to cellulose fibers includes a method of adding sulfuric acid to the cellulose fibers and heating, and the like.

The method of introducing a phosphate group as an anionic group to cellulose fibers includes a method of mixing cellulose fibers which are in a dry state or a wet state with a powder or an aqueous solution of phosphoric acid or a phosphoric acid derivative; a method of adding an aqueous solution of phosphoric acid or a phosphoric acid derivative to a dispersion of cellulose fibers; and the like. When these methods are employed, a dehydration treatment, a heating treatment and the like are generally carried out after mixing or adding a powder or an aqueous solution of phosphoric acid or a phosphoric acid derivative.

(Modifying Group)

The bonding of the modifying group in the hydrophobically modified cellulose fibers (A) as used herein means that an anionic group, preferably a carboxy group, of a cellulose fiber surface is in a state of ionic bonding and/or covalent bonding with a modifying group. The bonding form to the anionic group includes ionic bonding and covalent bonding. The covalent bonding as used herein includes, for example, an amide bonding, an ester bonding, and an urethane bonding, among which an amide bonding is preferred, from the viewpoint of inhibiting the migration of the oil to the fluid. It is preferable that the hydrophobically modified cellulose fibers (A) in the present invention are obtained by an conically bonding and/or an amide-bonding a compound for introducing a modifying group to a carboxy group already existing on the cellulose fiber surface, from the viewpoint of inhibiting the migration of the oil to the (Compound for Introducing Modifying Group)

The compound for introducing a modifying group may be any of those capable of introducing a modifying group described later, and, for example, the following compounds can be used, depending upon the bonding forms. In the case of an ionic bonding, the compound may be any one of primary amines, secondary amines, tertiary amines, quaternary ammonium compounds, and phosphonium compounds. Among them, preferred are primary amines, secondary amines, tertiary amines, and quaternary ammonium compounds, from the viewpoint of the dispersibility. In addition, an anionic component for the above ammonium compound or phosphonium compound includes preferably halogen ions such as chlorine ions and bromine ions, hydrogensulfate ions, perchlorate ions, tetrafluoroborate ions, hexafluorophosphate ions, trifluoromethanesulfonate ions, and hydroxy ions, and more preferably hydroxy ions, from the viewpoint of the reactivities. In the case of a covalent bonding, the following compounds can be used depending upon the substituted functional groups.

In the modification to a carboxy group, in the case of an amide bonding, the compound may be any one of primary amines and secondary amities. In the case of an ester bonding, an alcohol is preferred, which includes, for example, butanol, octanol, and dodecanol. In the case of an urethane bonding, an isocyanate compound is preferred.

As the modifying group in the hydrophobically modified cellulose fibers (A), a hydrocarbon group or the like can be used. These modifying groups may be bound (introduced) to the cellulose fibers, alone or in a combination of two or more kinds.

(Hydrocarbon Group)

The hydrocarbon group includes, for example, chained saturated hydrocarbon groups, chained unsaturated hydrocarbon groups, cyclic saturated hydrocarbon groups, and aromatic hydrocarbon groups, and it is preferable that the hydrocarbon group is chained saturated hydrocarbon groups, cyclic saturated hydrocarbon groups, and aromatic hydrocarbon groups, from the viewpoint of inhibiting side reactions, and from the viewpoint of stability. The number of carbon atoms of the hydrocarbon group is preferably 1 or more, more preferably 2 or more, and even more preferably 3 or more, from the viewpoint of the slippery surface properties, and the number of carbon atoms is preferably 30 or less, more preferably 24 or less, and even more preferably 18 or less, from the same viewpoint.

The chained saturated hydrocarbon group may be linear or branched. The number of carbon atoms of the chained saturated hydrocarbon group is preferably 1 or more, more preferably 2 or more, even more preferably 3 or more, even more preferably 6 or more, and even more preferably 8 or more, from the viewpoint of the slippery surface properties and the inhibition of the migration of the oil to the fluid. In addition, the number of carbon atoms is preferably 30 or less, more preferably 24 or less, even more preferably 18 or less, and even more preferably 16 or less, from the same viewpoint. Here, the number of carbon atoms of the hydrocarbon group hereinafter means the number of carbon atoms in one modifying group.

Specific examples of the chained saturated hydrocarbon group include, for example, a methyl group, an ethyl group, a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl, a docosyl group, an octacosanyl group, and the like, and preferred are a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl, a docosyl group, and an octacosanyl group, from the viewpoint of the slippery surface properties and the inhibition of the migration of the oil to the fluid. These chained saturated hydrocarbon groups may be introduced alone or in a given proportion of two or more kinds.

The chained unsaturated hydrocarbon group may be linear or branched. The number of carbon atoms of the chained unsaturated hydrocarbon group is preferably 1 or more, more preferably 2 or more, and even more preferably 3 or more, from the viewpoint of handling property. In addition, the number of carbon atoms is preferably 30 or less, more preferably 18 or less, even more preferably 12 or less, and still even more preferably 8 or less, from the viewpoint of easy availability.

Specific examples of the chained unsaturated hydrocarbon group include, for example, an ethylene group, a propylene group, a butene group, an isobutene group, an isoprene group, a pentene group, a hexene group, a heptene group, an octene group, a nonene group, a decene group, a dodecene group, a tridecene group, a tetradecene group, and an octadecene group, and preferred are an ethylene group, a propylene group, a butene group, an isobutene group, an isoprene group, a pentene group, a hexene group, a heptene group, an octene group, a nonene group, a decene group, and a dodecene group, from the viewpoint of the slippery surface properties and the inhibition of the migration of the oil to the fluid. These chained unsaturated hydrocarbon groups may be introduced alone or in a given proportion of two or more kinds.

The number of carbon atoms of the cyclic saturated hydrocarbon group is preferably 3 or more, more preferably 4 or more, and even more preferably 5 or more, from the viewpoint of handling property. In addition, the number of carbon atoms is preferably 20 or less, more preferably 16 or less, even more preferably 12 or less, and even more preferably 8 or less, from the viewpoint of easy availability.

Specific examples of the cyclic saturated hydrocarbon group include, for example, a cyclopropane group, a cyclobutyl group, a cyclopentane group, a cyclohexyl group, a cycloheptyl group, a cyclooctyl group, a cyclononyl group, a cyclodecyl group, a cyclododecyl group, a cyclotridecyl group, a cyclotetradecyl group, a cyclooctadecyl group, and the like, and preferred are a cyclopropane group, a cyclobutyl group, a cyclopentane group, a cyclohexyl group, a cycloheptyl group, a cyclooctyl group, a cyclononyl group, a cyclodecyl group, and a cyclododecyl group, from the viewpoint of the slippery surface properties and the inhibition of the migration of the oil to the fluid. These cyclic saturated hydrocarbon groups may be introduced alone or in a given proportion of two or more kinds.

The aromatic hydrocarbon groups are, for example, selected from the group consisting of aryl groups and aralkyl groups. As the aryl group and the aralkyl group, those groups in which the aromatic ring moiety is substituted or unsubstituted may be used.

A total number of carbon atoms of the above aryl group may be 6 or more, and a total number of carbon atoms is preferably 24 or less. more preferably 20 or less, even more preferably 14 or less, even more preferably 12 or less, and even more preferably 10 or less, from the viewpoint of the slippery surface properties and the inhibition of the migration of the oil to the fluid.

A total number of carbon atoms of the above aralkyl group is 7 or more, and a total number of carbon atoms is preferably 8 or more, from the viewpoint of the slippery surface properties and the inhibition of the migration of the oil to the fluid. Also, a total number of carbon atoms is preferably 24 or less, more preferably 20 or less, even more preferably 14 or less, even more preferably 13 or less, and even more preferably 11 or less, from the same viewpoint.

The aryl group includes, for example, a phenyl group, a naphthyl group, an anthryl group, a phenanthryl group, a biphenyl group, a triphenyl group, a terphenyl group, and groups in which these groups are substituted with a substituent given later, and these aryl groups may be introduced alone or in a given proportion of two or more kinds. Among them, a phenyl group, a biphenyl group, and a terphenyl group are preferred, from the viewpoint of the slippery surface properties and the inhibition of the migration of the oil to the fluid.

The aralkyl group includes, for example, a benzyl group, a phenethyl group, a phenylpropyl group, a phenylpentyl group, a phenylhexyl group, a phenylheptyl group, a phenyloctyl group, and groups in which an aromatic group of these groups is substituted with a substituent given later, and these aralkyl groups may be introduced alone or in a given proportion of two or more kinds. Among them, a benzyl group, a phenethyl group, a phenylpropyl group, a phenylpentyl group, a phenylhexyl group, and a phenylheptyl group are preferred, from the viewpoint of the slippery surface properties and the inhibition of the migration of the oil to the fluid.

As the primary amine, the secondary amine, the tertiary amine, the quaternary ammonium compound, the phosphonium compound, the acid anhydride, and the isocyanate compound, each for introducing the above hydrocarbon group, commercially available products can be used, or the compound can be prepared in accordance with a known method.

As the primary to tertiary amines, the number of carbon atoms is preferably 1 or more, more preferably 2 or more, and even more preferably 3 or more, from the viewpoint of the slippery surface properties, and the number of carbon atoms is preferably 20 or less, more preferably 18 or less, and even more preferably 16 or less, from the same viewpoint, provided that amino-modified silicone compounds are excluded. Specific examples of the primary to tertiary amines include, for example, ethylamine, diethylamine, triethylamine, propylamine, dipropylamine, butylamine, dibutylamine, hexylamine, dihexylamine, octylamine, dioctylamine, trioctylamine, dodecylamine, didodecylamine, stearylamine, distearylamine, monoethanolamine, diethanolamine, triethanolamine, aniline, and benzylamine, and amino-modified silicone compounds, and the like. The quaternary ammonium compound includes, for example, tetramethylammonium hydroxide (TMAH), tetraethylammonium hydroxide (TEAH), tetraethylammonium chloride, tetrapropylammonium hydroxide (TPAH), tetrabutylammonium hydroxide (TBAH), tetrabutylammonium chloride, lauryltrimethylammonium chloride, dilauryldimethyl chloride, stearyltrimethylammonium chloride, distearyldimethylammonium chloride, cetyltrimethylammonium chloride, and alkylbenzyldimethylammonium chlorides. Among them, preferred are propylamine, dipropylamine, butylamine, dibutylamine, hexylamine, dihexylamine, octylamine, dioctylamine, trioctylamine, dodecylamine, didodecylamine, distearylamine, amino-modified silicone compounds, tetraethylammonium hydroxide (TEAM, tetrabutylammonium hydroxide (TBAH), tetrapropylammonium hydroxide (TPAH), and aniline, more preferred are propylamine, dodecylamine, amino-modified silicone compounds, tetrabutylammonium hydroxide (TBAH), and aniline, and even more preferred are amino-modified silicone compounds, from the viewpoint of the slippery surface properties and the inhibition of the migration of the oil to the fluid.

Among these compounds, especially the hydrophobically modified cellulose fibers obtained by using an amino-modified silicone compound are useful as the raw materials for a film, particularly a slippery surface film. Therefore, one embodiment of the present invention provides hydrophobically modified cellulose fibers in which anionically modified cellulose fibers are bound to an amino-modified silicone compound at an anionic group. When the hydrophobically modified cellulose fibers are used as a slippery surface film, the excellent effects of the slippery surface properties and the inhibitory property of the migration of the oil to the fluid can be exhibited.

(Amino-Modified Silicone Compound)

The amino-modified silicone compound includes amino-modified silicone compounds having a kinetic viscosity at 25° C. of from 10 to 20,000 mm$^2$/s and an amino equivalence of from 400 to 8,000 g/mol as preferred compounds.

The kinetic viscosity at 25° C. can be obtained with an Ostwald's viscometer, and the kinetic viscosity is more preferably from 200 to 10,000 mm$^2$/s, and even more preferably from 500 to 5,000 mm$^2$/s, from the viewpoint of the slippery surface properties and the inhibition of the migration of the oil to the fluid.

In addition, the amino equivalence is preferably from 400 to 8,000 g/mol, more preferably from 600 to 5,000 g/mol, and even more preferably from 800 to 3,000 g/mol, from the viewpoint of the slippery surface properties and the inhibition of the migration of the oil to the fluid. Here, the amino equivalence is a molecular weight per one nitrogen atom, which can be obtained by amino equivalence, g/mol=mass-average molecular weight/the number of nitrogen atoms per molecule.

Here, the mass-average molecular weight is a value obtained by gel permeation chromatography using polystyrenes as standard substances, and the number of nitrogen atoms can be obtained by elemental analysis method.

Specific examples of the amino-modified silicone compound include a compound represented by the general formula (a1):

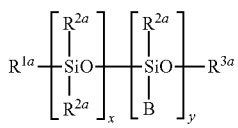

(a1)

wherein $R^{1a}$ is a group selected from an alkyl group having from 1 to 3 carbon atoms, a hydroxy group, an alkoxy group having, from 1 to 3 carbon atoms, or a hydrogen atom, and from the viewpoint of the slippery surface properties and the inhibition of the migration of the oil to the fluid, preferred is a methyl group or a hydroxy group; $R^{2a}$ is a group selected from an alkyl group having from 1 to 3 carbon atoms, a hydroxy group, or a hydrogen atom, and from the viewpoint of the slippery surface properties and the inhibition of the migration of the oil to the fluid, preferred is a methyl group or a hydroxy group; B is a side chain having at least one amino group; $R^{3a}$ is an alkyl group having from 1 to 3 carbon atoms or a hydrogen atom; and each of x and y is an average degree of polymerization, which is selected so that the kinetic viscosity at 25° C. and the amino equivalence of the compound fall within the range as defined above; here, each of $R^{1a}$, $R^{2a}$, and $R^{3a}$ may be identical or different, or plural $R^{2a}$'s may be identical or different.

In the compound of the general formula (a1), from the viewpoint of the slippery surface properties and the inhibition of the migration of the oil to the fluid, x is preferably the number of from 10 to 10,000, more preferably the number of from 20 to 5,000, and even more preferably the number of from 30 to 3,000; and y is preferably the number of from 1 to 1,000, more preferably the number of from 1 to 500, and even more preferably the number of from 1 to 200. The mass-average molecular weight of the compound of the general formula (a1) is preferably from 2,000 to 1,000,000, more preferably from 5,000 to 100,000, and even more preferably from 8,000 to 50,000.

In the general formula (a1), the side chain B having an amino group or amino groups includes the following ones:
—$C_3H_6$—$NH_2$,
—$C_3H_6$—NH—$C_2H_4$—$NH_2$,
—$C_3H_6$—NH—$[C_2H_4$—NH$]_e$—$C_2H_4$—$NH_2$,
—$C_3H_6$—NH(CH$_3$),
—$C_3H_6$—NH—$C_2H_4$—NH(CH$_3$),
—$C_3H_6$—NH—$[C_2H_4$—NH$]_f$—$C_2H_4$—NH(CH$_3$),
—$C_3H_6$—N(CH$_3$)$_2$,
—$C_3H_6$—N(CH$_3$)—$C_2H_4$—N(CH$_3$)$_2$,
—$C_3H_6$—N(CH$_3$)—$[C_2H_4$—N(CH$_3$)$]_g$—$C_2H_4$—N(CH$_3$)$_2$, and
—$C_3H_6$—NH-cyclo-$C_5H_{11}$,
wherein each of e, f, and g is the number of from 1 to 30.

The amino-modified silicone compound used in the present invention can be produced by, for example, heating a hydrolysate obtained by hydrolyzing an organoalkoxysilane represented by the general formula (a2):

  (a2)

with excess water, a dimethyl polysiloxane, and a basic catalyst such as sodium hydroxide at 80° to 110° C. to carry out an equilibrium reaction, and neutralizing the basic catalyst with an acid at a time point when a reaction mixture reaches a desired viscosity (see, Japanese Patent Laid-Open No. Sho-53-98499).

In addition, the amino-modified silicone compound preferably one or more members selected from the group consisting of preferably monoamino-modified silicones having one amino group in one side chain B and diamino-modified silicones having two amino groups in one side chain B, and more preferably one or more members selected from the group consisting of a compound in which a side chain B having an amino group is represented by —$C_3H_6$—$NH_2$[hereinafter referred to as an (a1-1) component], and a compound in which a side chain B having amino groups is represented by —$C_3H_6$—NH—$C_2H_4$—$NH_2$[hereinafter referred to as an (a1-2) component], from the viewpoint of the slippery surface properties and the inhibition of the migration of the oil to the fluid.

The amino-modified silicone compound in the present invention is preferably ones manufactured by Momentive Performance Materials, Inc., TSF4703 (kinetic viscosity: 1,000, amino equivalence: 1,600) and TSF4708 (kinetic viscosity: 1,000, amino equivalence: 2,800); ones manufactured by Dow Corning-Toray Silicone Co., Ltd., SF8457C (kinetic viscosity: 1,200, amino equivalence: 1,800), SF8417 (kinetic viscosity: 1,200, amino equivalence: 1,700), BY16-209 (kinetic viscosity: 500, amino equivalence: 1,800), BY16-892 (kinetic viscosity: 1,500, amino equivalence: 2,000), BY16-898 (kinetic viscosity: 2,000, amino equivalence: 2,900), FZ-3760 (kinetic viscosity: 220, amino equivalence: 1,600); ones manufactured by Shin-Etsu Chemical Co., Ltd., KF8002 (kinetic viscosity: 1,100, amino equivalence: 1,700), KF867 (kinetic viscosity: 1,300, amino equivalence: 1,700), KF-864 (kinetic viscosity: 1,700, amino equivalence: 3,800), BY16-213 (kinetic viscosity: 55, amino equivalence: 2,700), BY16-853U (kinetic viscosity: 14, amino equivalence: 450), from the viewpoint of the performance. Within the parentheses ( ), the kinetic viscosity shows a measured value at 25° C. (units: mm$^2$/s), and the units for the amino equivalence are g/mol.

As the component (a1-1), BY16-213 (kinetic viscosity: 55, amino equivalence: 2,700), and BY16-853U (kinetic viscosity: 14, amino equivalence: 450) are more preferred.

As the component (a1-2), SF8417 (kinetic viscosity: 1,200, amino equivalence: 1,700), BY16-209 (kinetic viscosity: 500, amino equivalence: 1,800), and FZ-3760 (kinetic viscosity: 220, amino equivalence: 1,600) are more preferred.

The average binding amount of the modifying group in the hydrophobically modified cellulose fibers (A), based on the cellulose fibers, is preferably 0.01 mmol/g or more, more preferably 0.05 mmol/g or more, even more preferably 0.1 mmol/g or more, even more preferably 0.3 mmol/g or more, and even more preferably 0.5 mmol/g or more, from the viewpoint of the slippery surface properties and the inhibition of the migration of the oil to the fluid. In addition, the average binding amount is preferably 3 mmol/g or less, more preferably 2.5 mmol/g or less, even more preferably 2 mmol/g or less, even more preferably 1.8 mmol/g or less, and even more preferably 1.5 mmol/g or less, from the viewpoint of the reactivities. Here, in a case where two or more optional modifying groups are simultaneously introduced into the cellulose fibers as modifying groups, it is preferable that the average binding amount of the modifying groups is within the range defined above for the total amount of the modifying groups to be introduced.

The introduction ratio of the modifying group in the hydrophobically modified cellulose fibers (A), for any of the modifying groups, is preferably 10% or more, more preferably 30% or more, even more preferably 50% or more, even more preferably 60% or more, and even more preferably 70% or more, from the viewpoint of the slippery surface properties and the inhibition of the migration of the oil to the fluid, and the introduction ratio is preferably 99% or less, more preferably 97% or less, even more preferably 95% or less, and even more preferably 90% or less, from the viewpoint of the reactivities. Here, in a case where two or more optional modifying groups are simultaneously introduced into the cellulose fibers as modifying groups, it is preferable that a total of the introduction ratio is within the range defined above in the range where the upper limit does not exceed 100%.

Here, the above modifying group may further have a substituent. For example, in a case where the modifying group is a hydrocarbon group, it is preferable that a total number of carbons of an overall modifying group including a substituent is within the range defined above. The substituent includes, for example, alkoxy groups having from 1 to 6 carbon atoms, such as a methoxy group, an ethoxy group, a propoxy group, an isopropoxy group, a butoxy group, an isobutoxy group, a sec-butoxy group, a tert-butoxy group, a pentyloxy group, an isopentyloxy group, and a hexyloxy group; alkoxycarbonyl groups of which alkoxy group has from 1 to 6 carbon atoms, such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, a pentyloxycarbonyl group, and an isopentyloxycarbonyl group; halogen atoms such as a fluorine atom, a chlorine atom, a bromine atom, and an iodine atom; acyl groups having from 1 to 6 carbon atoms such as an acetyl group and a propionyl group; aralkyl groups; aralkyloxy groups; alkylamino groups having from 1 to 6 carbon atoms; and dialkylamino groups of which alkyl group has from 1 to 6 carbon atoms. Here, the hydrocarbon group mentioned above itself may be bonded as a substituent.

The average binding amount and the introduction ratio of the modifying group in the hydrophobically modified cellulose fibers (A) as used herein can be adjusted by an amount and the kinds of a compound for introducing a modifying group, a reaction temperature, a reaction time, a solvent, or the like. The average binding amount, mmol/g, and the introduction ratio, %, of the modifying group refer to an amount and a proportion of the modifying group introduced to an anionic group on the surface of the hydrophobically modified cellulose fibers (A). The content of the anionic group of the hydrophobically modified cellulose fibers (A) can be calculated in accordance with a known method (for example, titration, IR determination, or the like). The average binding amount and the introduction ratio of the modifying group in the hydrophobically modified cellulose fibers (A) can be calculated in accordance with, for example, methods described in Examples.

[Method for Producing Hydrophobically Modified Cellulose Fibers (A)]

The hydrophobically modified cellulose fibers (A) usable in the present invention are not particularly limited so long as the above anionically modified cellulose fibers can be introduced with a modifying group, and can be produced in accordance with a known method. Here, the anionically modified cellulose fibers as used herein can be prepared as oxidized cellulose fibers in which an aldehyde is removed by further carrying out an additional oxidation treatment or a reduction treatment mentioned above, by referring to a known method, for example, a method described in Japanese Patent Laid-Open No. 2011-140632.

Specific methods for production include the following two embodiments depending upon the embodiments of introducing a modifying group to oxidized cellulose fibers. Specifically, an embodiment in which oxidized cellulose fibers are bound to a modifying group via an ionic bonding (Embodiment A); and an embodiment in which oxidized cellulose fibers are bound to a modifying group via a covalent bonding (Embodiment B). Here, a case of an amide bonding as a covalent bonding is shown hereinbelow.

Embodiment A step (1): oxidizing natural cellulose fibers in the presence of an N-oxyl compound, to provide oxidized cellulose fibers; and step (2A): mixing the oxidized cellulose fibers obtained in the step (1) and a compound for introducing a modifying group.

Embodiment B step (1): oxidizing natural cellulose fibers in the presence of an N-oxyl compound, to provide oxidized cellulose fibers; and step (2B): subjecting the oxidized cellulose fibers obtained in the step (1) and a compound for introducing a modifying group to an amidation reaction.

The method of introducing a modifying group can be carried out by referring to, for example, a method described in Japanese Patent Laid-Open No. 2015-143336 for Embodiment A, or to a method described in Japanese Patent Laid-Open No. 2015-143337 for Embodiment B. In addition, in the present invention, a method including, subsequent to the step (1), carrying out a finely fibrillating step described later, to provide fine cellulose fibers, and thereafter carrying out a step (2A or 2B) (First Production Embodiment); and a method including, sequentially carrying out the step (1) and the step (2A or 2B), and thereafter carrying out a finely fibrillating step, to provide fine cellulose fibers (Second Production Embodiment) may be carried out.

Here, the cellulose fibers after the finely fibrillating treatment may be particularly referred to as "fine cellulose fibers" in some cases.

The method for producing fine cellulose fibers will be explained hereinafter, on the basis of First Production Embodiment of the Embodiment A.

[Step (1)]

The step (1) is a step of oxidizing natural cellulose fibers in the presence of an N-oxyl compound, to provide oxidized cellulose fibers. Specifically, natural cellulose fibers are subjected to an oxidation treatment step (for example, an oxidation treatment with 2,2,6,6-tetramethylpiperidin-1-oxyl (TEMPO)), described in Japanese Patent Laid-Open No. 2015-143336 or 2015-143337 and (optionally) a purifying step, thereby obtaining oxidized cellulose fibers having a carboxy group content of preferably 0.1 mmol/g or more. By carrying out an oxidation treatment of the cellulose fibers with TEMPO as a catalyst, a hydroxymethyl group ($-CH_2OH$) at C6 position of the cellulose constituting unit is selectively converted to a carboxy group. Particularly this method is advantageous in the aspects of being excellent in the selectivity of a hydroxyl group at C6 position which is to be oxidized on the surface of the raw material cellulose fibers, and being mild in reaction conditions.

(Finely Fibrillating Step)

Next, after the (optional) purifying step, a step of finely fibrillating the oxidized cellulose fibers obtained in the step (1) is carried out, to provide fine oxidized cellulose fibers. In the finely fibrillating step, it is preferable that the oxidized cellulose fibers obtained through the purifying step are dispersed in a solvent, and subjected to a finely fibrillating treatment.

The solvent used as a dispersion medium is exemplified by water; an alcohol having from 1 to 6 carbon atoms, and preferably from 1 to 3 carbon atoms, such as methanol, ethanol, or propanol; a ketone having from 3 to 6 carbon atoms, such as acetone, methyl ethyl ketone or methyl isobutyl ketone; a linear or branched, saturated hydrocarbon or unsaturated hydrocarbon having from 1 to 6 carbon atoms; an aromatic hydrocarbon such as benzene or toluene; a halogenated hydrocarbon such as methylene chloride or chloroform; a lower alkyl ether having from 2 to 5 carbon atoms; a polar solvent such as N,N-dimethylformamide, N,N-dimethylacetamide, dimethyl sulfoxide, or a diester of succinic acid and triethylene glycol monomethyl ether, and the like. These solvents can be used alone or in a mixture of two or more kinds. The solvent is preferably water, an alcohol having from 1 to 6 carbon atoms, a ketone having from 3 to 6 carbon atoms, a lower alkyl ether having from 2 to 5 carbon atoms, or a polar solvent such as N,N-dimethylformamide, N,N-dimethylacetamide, dimethyl sulfoxide, or a diester of succinic acid and methyl triglycol, from the viewpoint of operability of the finely fibrillating treatment, and more preferably water, from the viewpoint of environmental-friendliness. The amount of the solvent used is not particularly limited, so long as the amount used is an effective amount that can disperse the oxidized cellulose fibers. The solvent is used in an amount of preferably from 1 to 500 times the mass, and more preferably from 2 to 200 times the mass, based on the oxidized cellulose fibers.

As an apparatus to be used in the finely fibrillating treatment, a known dispersing machine is suitably used. For example, a disintegrator, a beating machine, a low-pressure homogenizer, a high-pressure homogenizer, a grinder, a cutter mill, a ball-mill, a jet mill, a short shaft extruder, a twin-screw extruder, a pressurized kneader, a Banbury mixer, Labo-plastomill, an ultrasonic agitator, a juice mixer for households, or the like can be used. In addition, the solid content of the reaction product fibers in the finely fibrillating treatment is preferably 50% by mass or less.

Thus, cellulose fibers in which a hydroxyl group at C6 position of the constituting unit of the cellulose fibers is selectively oxidized to a carboxy group via an aldehyde group can be obtained.

[Step (2A)]

In First Production Embodiment, the step (2A) is a step of mixing the oxidized cellulose fibers obtained through the above-mentioned step and a compound for introducing a modifying group, to provide hydrophobically modified cellulose fibers (A). Specifically, the oxidized cellulose fibers and a compound for introducing a modifying group may be mixed in a solvent; for example, oxidized cellulose fibers can be produced in accordance with a method described in Japanese Patent Laid-Open No. 2015-143336.

The compound for introducing a modifying group, usable in the step (2A) includes those mentioned above.

The amount of the above compound used can be determined according to the desired binding amount of the modifying group in the hydrophobically modified cellulose fibers (A), and the compound is used in an amount such that the amino groups, based on one mol of the carboxy groups contained in the oxidized cellulose fibers are used in an amount of preferably 0.01 mol or more, and more preferably 0.1 mol or more, from the viewpoint of the reactivities, and that the amino groups are used in an amount of preferably 50 mol or less, more preferably 20 mol or less, and even more preferably 10 mol or less, from the viewpoint of manufactured article purity. Here, the compounds in an amount contained in the above range may be supplied to the reaction at once, or may be supplied in divided portions. When the compound is a monoamine, the above amino groups are the same as the amine.

As the solvent, it is preferable to select a solvent that dissolves a compound used, and the solvent includes, for example, methanol, ethanol, isopropanol (IPA), N,N-dimethylformamide (DMF), dimethyl sulfoxide (DMSO), N,N-dimethylacetamide, tetrahydrofuran (THF), a diester of succinic acid and triethylene glycol monomethyl ether, acetone, methyl ethyl ketone (MEK), acetonitrile, dichloromethane, chloroform, toluene, acetic acid, water, and the like. These solvents can be used alone or in a combination of two or more kinds. Among these polar solvents, a diester of succinic acid and triethylene glycol monomethyl ether, ethanol, DMF, and water are preferred.

The temperature during mixing is preferably 0° C. or higher, more preferably 5° C. or higher, and even more preferably 10° C. or higher, from the viewpoint of the reactivities of the compound. In addition, the temperature is preferably 50° C. or lower, more preferably 40° C. or lower, and even more preferably 30° C. or lower, from the viewpoint of the manufactured article quality, such as coloration. The mixing time can be appropriately set depending upon the kinds of the compounds and solvents used, and the mixing time is preferably 0.01 hours or more, more preferably 0.1 hours or more, and even more preferably 1 hour or more, from the viewpoint of the reactivities of the compound, and the mixing time is preferably 48 hours or less, and more preferably 24 hours or less, from the viewpoint of the productivity.

After the formation of the hydrophobically modified cellulose fibers (A), appropriate post-treatments may be carried out in order to remove unreacted compounds and the like. As the method for post-treatments, for example, filtration, centrifugation, dialysis, or the like can be used.

In addition, in the method for production of Embodiment B, the step (1) can be carried out in the same manner as in Embodiment A, so that the step (2B) in First Production Embodiment will be described hereinbelow. Also, for example, the compound can be produced by a method described in Japanese Patent Laid-Open No. 2013-151661.

[Step (2B)]

In First Production Embodiment, the step (2B) is a step of subjecting the oxidized cellulose fibers obtained through the above-mentioned step and a compound for introducing a modifying group to an amidation reaction, to provide cellulose fibers. As the above mixing method, there would be no problems so long as the raw materials are mixed to an extent that are reactive. Specifically, the above raw materials are mixed in the presence of a condensing agent, so that a carboxy group contained in oxidized cellulose fibers and an amino group of the compound for introducing a modifying group are subjected to a condensation reaction, to form an amide bonding.

The compound for introducing a modifying group, usable in the step (2B) includes those mentioned above.

In the step (2B), the oxidized cellulose fibers and the compound for introducing a modifying group are subjected to amidation in the presence of a condensing agent.

The amount of the above compound for introducing a modifying group used is an amount such that the amino groups, based on one mol of the carboxy groups contained in the oxidized cellulose fibers are used in an amount of preferably 0.1 mol or more, and more preferably 0.5 mol or more, from the viewpoint of the reactivities, and that the amino groups are used in an amount of preferably 50 mol or less, more preferably 20 mol or less, and even more preferably 10 mol or less, from the viewpoint of manufactured article purity. Here, the compounds in an amount contained in the above range may be supplied to the reaction at once, or may be supplied in divided portions.

The condensing agent is not particularly limited, and includes condensing agents described in Gosei Kagaku Shirizu Pepuchido Gosei (*Synthetic Chemistry Series Peptide Synthesis*) (Maruzen Publishing), page 116, or described in Tetrahedron, 57, 1551(2001), and the like. The condensing agent includes, for example, 4-(4,6-dimethoxy-1,3,5-triazin-2-yl)-4-methylmorpholinium chloride (may be hereinafter referred to as "DMT-MM" in some cases), and the like.

In the above amidation reaction, the solvent includes those in the above finely fibrillating step, and it is preferable to select a solvent that dissolves a compound used.

The reaction time and the reaction temperature in the above amidation reaction can be appropriately selected in accordance with the kinds of the compounds used and the solvents used and the like. The reaction time is preferably from 1 to 24 hours, and more preferably from 10 to 20 hours, from the viewpoint of reaction ratio. Also, the reaction temperature is preferably 0° C. or higher, more preferably 5° C. or higher, and even more preferably 10° C. or higher, from the viewpoint of the reactivities. In addition, the reaction temperature is preferably 200° C. or lower, more preferably 80° C. or lower, and even more preferably 30° C. or lower, from the viewpoint of the manufactured article qualities such as the coloration.

After the above reaction, post-treatments may be appropriately carried out in order to remove unreacted compounds, the condensing agent, and the like. As the method for post-treatments, for example, filtration, centrifugation, dialysis, or the like can be used.

Here, in both of Embodiment A and Embodiment B, in Second Production Embodiment, each of the steps mentioned above can be carried out in the same manner as First Production Embodiment except that the steps are carried out in the order of the step (1), the step (2A) or step (2B), and the finely fibrillating step.

In addition, the hydrophobically modified cellulose fibers may be obtained by combining Embodiments A and B, specifically, the hydrophobically modified cellulose fibers may be hydrophobically modified cellulose fibers having a modifying group bound via an ionic bonding and a modifying group bound via an amide bonding. In this case, either the step (2A) or (2B) may be carried out first.

Thus, hydrophobically modified cellulose fibers in which cellulose fibers are bound to a modifying group via an ionic bonding and/or a covalent bonding can be obtained.

<Hydrophobically Modified Cellulose Fibers (B) (Etherified Cellulose Fibers)>

The hydrophobically modified cellulose fibers (B) in the present invention, which are also referred to as etherified cellulose fibers, have a feature in that the cellulose fibers are bound to a modifying group via an ether bonding at the surface, wherein the hydrophobically modified cellulose fibers preferably have a cellulose I crystal structure. The phrase "bound . . . via an ether bonding" as used herein means a state in which a hydroxyl group of a cellulose fiber surface is reacted with a modifying group to be ether-bound.

The modifying group in the etherified cellulose fibers is preferably a hydrocarbon group which may have a substituent. Here, in the hydrocarbon group which may have a substituent, the hydrocarbon group includes saturated or unsaturated, linear or branched aliphatic hydrocarbon groups, aromatic hydrocarbon groups such as a phenyl group, or alicyclic hydrocarbon groups such as a cyclohexyl group. In addition, in the hydrocarbon group which may have a substituent in the present invention, the substituent includes halogen atoms, oxyalkylene groups such as an oxyethylene group, and a hydroxyl group, and the like.

A preferred embodiment of the etherified cellulose fibers described above, named "Embodiment 1" includes, for example, cellulose fibers bound to one or more substituents, via an ether bonding, selected from substituents represented by the following general formula (1) and substituents represented by the following general formula (2):

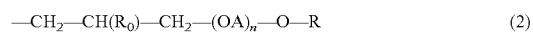

wherein $R_0$ in the general formula (1) and the general formula (2) is a hydrogen atom or a hydroxyl group; each of $R_1$ is independently a linear or branched alkyl having 3 or more carbon atoms and 30 or less carbon atoms; n in the general formula (2) is the number of 0 or more and 50 or less; and A is a linear or branched, divalent saturated hydrocarbon group having 1 or more carbon atoms and 6 or less carbon atoms, wherein the etherified cellulose fibers have a cellulose I crystal structure.

A specific example of Embodiment 1 includes, for example, etherified cellulose fibers represented by the following general formula (4).

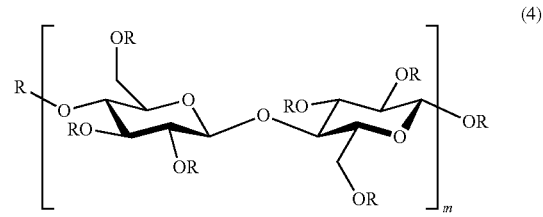

wherein R, each of which may be identical or different, is a hydrogen or a substituent selected from the substituents represented by the above general formula (1) and substituents represented by the above general formula (2); m is preferably an integer of 20 or more and 3,000 or less, with proviso that a case where all the R's are simultaneously hydrogen is excluded.

The etherified cellulose fibers represented by the general formula (4) have a repeating structure of cellulose units in which the above substituent is introduced. As the number of repeats of the repeating structure, m in the general formula (4) is preferably an integer of 20 or more and 3,000 or less, from the viewpoint of the slippery surface properties.

(Hydrocarbon Group Which May Have a Substituent)

The etherified cellulose fibers of Embodiment 1 are introduced with one or more substituents selected from the substituents of the above general formula (1) and the following general formula (2), alone or in any combinations. Here, even if the introduced substituent were either one of the substituents, each of the substituents, which may be the identical substituent or a combination of two or more kinds may be introduced.

$R_0$ in the general formula (1) and the general formula (2) is preferably a hydroxyl group, from the viewpoint of the slippery surface properties.

The number of carbon atoms of $R_1$ in the general formula (1) is preferably 25 or less, from the viewpoint of the slippery surface properties. Specific examples include a propyl group, a butyl group, a pentyl group, a hexyl group, a heptyl group, an octyl group, a 2-ethylhexyl group, a nonyl group, a decyl group, an undecyl group, a dodecyl group, a hexadecyl group, an octadecyl group, an isooctadecyl group, an icosyl group, a triacontyl group, and the like.

The number of carbon atoms of $R_1$ in the general formula (2) is preferably 4 or more, from the viewpoint of the slippery surface properties, and the number of carbon atoms is preferably 27 or less, from the viewpoint of improving the slippery surface properties, availability, and the reactivities. Specific examples include the same ones as $R_1$ in the general formula (1) mentioned above.

A in the general formula (2) forms an oxyalkylene group with an adjoining oxygen atom. The number of carbon atoms of A is preferably 2 or more, from the viewpoint of the slippery surface properties, availability, and costs, and the number of carbon atoms is preferably 4 or less, from the same viewpoint. Specific examples include a methylene group, an ethylene group, a propylene group, a butylene group, a pentylene group, a hexylene group, and the like.

In in the general formula (2) is the number of moles of alkylene oxides added. n is preferably 3 or more, from the viewpoint of the slippery surface properties, availability, and costs, and preferably 40 or less, from the same viewpoint.

The combination of A and n in the general formula (2) is preferably a combination in which A is a linear or branched, divalent saturated hydrocarbon group having 2 or more carbon atoms and 3 or less carbon atoms and n is the number of 0 or more and 20 or less, from the viewpoint of the slippery surface properties.

Specific examples of the substituent represented by the general formula (1) include, for example, a pentyl group, a hexyl group, an octyl group, a 2-ethylhexyl group, a decyl group, a dodecyl group, a tetradecyl group, a hexadecyl group, an octadecyl group, an isooctadecyl group, an icosyl group, a propylhydroxyethyl group, a butylhydroxyethyl group, a pentylhydroxyethyl group, a hexylhydroxyethyl group, a heptylhydroxyethyl group, an octylhydroxyethyl group, a 2-ethylhexylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an isooctadecylhydroxyethyl group, an icosylhydroxyethyl group, a triacontylhydroxyethyl group, and the like.

Specific examples of the substituent represented by the general formula (2) include, for example, a 3-butoxy-2-hydroxy-propyl group, a 3-hexoxyethyleneoxide-2-hydroxy-propyl group, a 3-hexoxy-2-hydroxy-propyl group, a 3-octoxyethyleneoxide-2-hydroxy-propyl group, a 3-octoxy-2-hydroxy-propyl group, a 6-ethyl-3-hexoxy-2-hydroxy-propyl group, a 6-ethyl-3-hexoxyethyleneoxide-2-hydroxy-propyl group, a 3-detoxyethyleneoxide-2-hydroxy-propyl group, a 3-detoxy-2-hydroxy-propyl group, a 3-undetoxyethyleneoxide-2-hydroxy-propyl group, a 3-undetoxy-2-hydroxy-propyl group, a 3-dodetoxyethyleneoxide-2-hydroxy-propyl group, a 3-dodetoxy-2-hydroxy-propyl group, a 3-hexadetoxyethyleneoxide-2-hydroxy-propyl group, a 3-hexadetoxy-2-hydroxy-propyl group, a 3-octadetoxyethyleneoxide-2-hydroxy-propyl group, a 3-octadetoxy-2-hydroxy-propyl group, and the like. Here, the number of moles of the alkylene oxides may be 0 or more and 50 or less, which includes, for example, substituents of which numbers of moles added in the substituent having an oxyalkylene group such as an ethylene oxide mentioned above are 10, 12, 13, and 20 mol.

(Introduction Ratio)

In the etherified cellulose fibers, although the introduction ratio of the modifying group based on one mol of the anhydrous glucose unit of the cellulose cannot be unconditionally limited because the introduction ratio depends upon the kinds of the modifying groups, the introduction ratio is preferably 0.0001 mol or more, from the viewpoint of the slippery surface properties, and the introduction ratio is preferably 1.5 mol or less, from the viewpoint of having a cellulose I crystal structure, and the slippery surface properties. Here, in a case where both the substituent represented by the general formula (1) and the substituent represented by the general formula (2) are introduced as the modifying groups, the introduction ratio refers to a total introduction molar ratio. Here, the introduction ratio of the modifying group in the etherified cellulose fibers as used herein can be measured in accordance with a method described in Examples set forth below.

(Average Fiber Diameter)

The etherified cellulose fibers in the present invention are not particularly limitative in the average fiber diameter, irrelevant to the kinds of the substituents. For example, embodiments include an embodiment where an average fiber diameter is in a micro-order, and an embodiment where an average fiber diameter is in a nano-order.

The etherified cellulose fibers of the embodiment in the micro-order are preferably 5 μm or more, from the viewpoint of the slippery surface properties, handling property, availability, and costs. In addition, the upper limit thereof is, but not particularly set to, preferably 100 μm or less, from the viewpoint of the slippery surface properties and handling property. Here, the average fiber diameter of the cellulose fibers in the micro-order as used herein can be measured in the same manner as the average fiber diameter of the raw material cellulose fibers.

The etherified cellulose fibers of the embodiment in the nano-order are preferably 1 nm or more, from the viewpoint of the slippery surface properties, handling property, availability, and costs, and preferably 500 nm or less, from the viewpoint of the slippery surface properties and handling property. Here, the average fiber diameter of the cellulose fibers in the nano-order can be measured in the same manner as the average fiber diameter of the anionically modified cellulose fibers.

[Method for Producing Etherified Cellulose Fibers]

The etherified cellulose fibers in the present invention are cellulose fibers bound at the surface, via an ether bonding, to a modifying group, and preferably a hydrocarbon group which may have a substituent mentioned above. The introduction of the modifying group can be carried out in accordance with a known method without particular limitations. Specific examples of a method for producing etherified cellulose fibers of Embodiment 1 will be described hereinbelow.

Specific examples of the method for producing etherified cellulose fibers of Embodiment 1 include an embodiment of treating the above raw material cellulose fibers with a specified compound in the presence of a base.

In addition, the previously finely fibrillated cellulose fibers may be used as the raw material cellulose fibers, from the viewpoint of the reduction of the number of production steps, and the average fiber diameter in that case is preferably 1 urn or more, from the viewpoint of availability and costs. Also, the upper limit thereof is, but not particularly set to, preferably 500 nm or less, from the viewpoint of handling property.

(Base)

In the present method for production, the above raw material cellulose fibers are mixed with a base.

The base is, but not particularly limited to, preferably one or more members selected from the group consisting of alkali metal hydroxides, alkaline earth metal hydroxides, primary to tertiary amines, quaternary ammonium salts, imidazoles and derivatives thereof, pyridine and derivatives thereof, and alkoxides, from the viewpoint of progressing the etherification reaction.

The alkali metal hydroxide and the alkaline earth metal hydroxide include sodium hydroxide, potassium hydroxide, lithium hydroxide, calcium hydroxide, barium hydroxide, and the like.

The primary to tertiary amines refer to primary amines, secondary amines, and tertiary amines, and specific examples include ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, triethylamine, and the like.

The quaternary ammonium salt includes tetrabutylammonium hydroxide, tetrabutylammoniurn chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, tetramethylammonium bromide, and the like.

The imidazole and derivatives thereof include 1-methylimidazole, 3-aminopropylimidazole, carbonyldiimidazole, and the like.

The pyridine and derivatives thereof include N,N-dimethyl-4-aminopyridine, picoline, and the like.

The alkoxide includes sodium methoxide, sodium ethoxide, potassium t-butoxide, and the like.

The amount of the base, based on the anhydrous glucose unit of the raw material cellulose fibers, is preferably 0.01 equivalents or more, from the viewpoint of progressing the etherification reaction, and the amount of the base is preferably 10 equivalents or less, from the viewpoint of the production costs.

The mixing of the raw material cellulose fibers and the base may be carried out in the presence of a solvent. The solvent includes, but not particularly limited to, for example, water, isopropanol, t-butanol, dimethylformamide, toluene, methyl isobutyl ketone, acetonitrile, dimethyl sulfoxide, dimethylacetamide, 1,3-dimethyl-2-imidazolidinone, hexane, 1,4-dioxane, and mixtures thereof.

The mixing of the raw material cellulose fibers and the base is not particularly limited in the temperature and time, so long as the components can be homogeneously mixed.

Next, to a mixture of the raw material cellulose fibers and the base obtained above is added a compound for introducing a modifying group, preferably a compound for introducing a hydrocarbon group which may have a substituent, to treat the raw material cellulose fibers with the compound. The compound is not particularly limited so long as the compound can be bound, via an ether bonding, to preferably one or more substituents selected from substituents represented by the general formula (1) and substituents represented by the general formula (2) during the reaction with the raw material cellulose fibers. In the present invention, it is preferable to use a compound having a cyclic structural group having reactivity, and it is more preferable to use a compound having an epoxy group, from the viewpoint of the reactivities and non-halogen-containing compound. Each of the compounds is exemplified hereinbelow.

A compound which is capable of being bound to a substituent represented by the general formula (1) via an ether bonding is, for example, preferably an alkylene oxide compound represented by the following general formula (1A):

wherein $R_1$ is a linear or branched alkyl group having 3 or more carbon atoms and 30 or less carbon atoms; and an alkyl halide represented by the general formula (1B):

wherein $R_1$ is a linear or branched alkyl group having 3 or more carbon atoms and 30 or less carbon atoms; and X is a halogen atom selected from fluorine, chlorine, bromine, or iodine.

The compound may be prepared in accordance with a known technique, or a commercially available product may be used. A total number of carbon atoms of the compound is preferably 3 or more, from the viewpoint of the slippery surface properties, and a total number of carbon atoms is preferably 32 or less, from the viewpoint of the slippery surface properties.

The number of carbon atoms of $R_1$ in the general formulas (1A) and (1B) is preferably 4 or more, from the viewpoint of the slippery surface properties, and the number of carbon atoms is preferably 25 or less, from the viewpoint of the slippery surface properties. Specific examples include those listed in the section of $R_1$ in the substituent represented by the general formula (1).

Specific examples of the compound represented by the general formula (1A) include 1,2-epoxyhexane, 1,2-epoxydecane, and 1,2-epoxyoctadecane.

Specific examples of the compound represented by the general formula (1B) include 1-chloropentane, 1-chlorohexane, 1-chlorooctane, 1-chlorodecane, 1-chlorododecane, 1-chlorohexadecane, 1-chlorooctadecane, 1-bromopentane, 1-bromohexane, 1-bromooctane, 1-bromodecane, 1-bromododecane, 1-bromohexadecane, 1-bromooctadecane, 1-iodopentane, 1-iodohexane, 1-iodooctane, 1-iododecane, 1-iodododecane, 1-iodohexadecane, and 1-iodooctadecane.

The compound capable of being bound, via an ether bonding, to a substituent represented by the general formula (2) is, for example, preferably a glycidyl ether compound represented by the following general formula (2A).

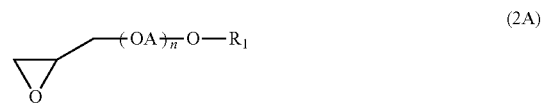

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is the number of 0 or more and 50 or less. The compound may be prepared in accordance with a known technique, or a commercially available product may be used. A total number of carbon atoms of the compound is preferably 5 or more, from the viewpoint of the slippery surface properties, and a total number of carbon atoms is preferably 100 or less, from the viewpoint of the slippery surface properties.

The number of carbon atoms of R in the general formula (2A) is preferably 4 or more, from the viewpoint of the slippery surface properties, and the number of carbon atoms is preferably 27 or less, from the viewpoint of the slippery surface properties. Specific examples include those listed in the section of $R_1$ in the substituent represented by the general formula (2).

A in the general formula (2A) forms an oxyalkylene group with an adjoining oxygen atom. The number of carbon atoms of A is preferably 2 or more, from the viewpoint of availability and costs, and the number of carbon atoms is preferably 4 or less, from the same viewpoint. Specific examples include those listed in the section of A in the substituent represented by the general formula (2), among which an ethylene group or a propylene group is preferred, and an ethylene group is more preferred.

n in the general formula (2A) is the number of moles of alkylene oxides added. n is preferably 3 or more, from the viewpoint of availability and costs, and preferably 40 or less, from the same viewpoint.

Specific examples of the compound represented by the general formula (2A) include butyl glycidyl ether, 2-ethylhexyl glycidyl ether, dodecyl glycidyl ether, stearyl glycidyl ether, isostearyl glycidyl ether, and polyoxyalkylene alkyl ethers.

The amount of the compound for introducing a modifying group can be determined by a desired introduction ratio of the modifying group in the etherified cellulose fibers obtained, and the amount of the compound based on the anhydrous glucose unit of the raw material cellulose fibers is preferably 0.01 equivalents or more, from the viewpoint of the reactivities, and the amount is preferably 10 equivalents or less, from the viewpoint of the production costs.

(Etherification Reaction)

The etherification reaction of the above compound and the raw material cellulose fibers can be carried out by mixing the two components in the presence of a solvent. The solvent is not particularly limited, and the solvents which are exemplified as being usable when the above base is present can be used.

The amount of the solvent used is not unconditionally determined because the amount depends upon the kinds of the raw material cellulose fibers and the compound for introducing a modifying group. The amount of the solvent used, based on 100 parts by mass of the raw material cellulose fibers, is preferably 30 parts by mass or more, from the viewpoint of the reactivities, and the amount used is preferably 10,000 parts by mass or less, from the viewpoint of the productivity.

The mixing conditions are not particularly limited so long as the raw material cellulose fibers and the compound for introducing a substituent are homogeneously mixed, so that the reaction can be sufficiently progressed, and continuous mixing treatment may or may not be carried out. In a case where a relatively large reaction vessel having a size exceeding 1 L is used, stirring may be appropriately carried out from the viewpoint of controlling the reaction temperature.

The reaction temperature is not unconditionally determined because the reaction temperature depends upon the kinds of the raw material cellulose fibers and the compound for introducing a substituent and an intended introduction ratio, and the reaction temperature is preferably 40° C. or higher, from the viewpoint of improving the reactivities, and the reaction temperature is preferably 120° C. or lower, from the viewpoint of inhibiting pyrolysis.

The reaction time is not unconditionally determined because the reaction time depends upon the kinds of the raw material cellulose fibers and the compound for introducing a substituent and an intended introduction ratio, and the reaction time is preferably 0.5 hours or more, from the viewpoint of the reactivities, and the reaction time is preferably 60 hours or less, from the viewpoint of the productivity.

After the reaction, a post-treatment can be appropriately carried out in order to remove an unreacted compound, an unreacted base, or the like. As desired, drying (vacuum drying etc.) may be further carried out.

Thus, etherified cellulose fibers are obtained.

With regard to both of the above hydrophobically modified cellulose fibers (A) and (B), the hydrophobically modified cellulose fibers obtained can be used in a state of a dispersion after carrying out the above post-treatments. Alternatively, solvents are removed from the dispersion by a drying treatment or the like, to provide dried hydrophobically modified cellulose fibers in a powder form, and this powder can also be used. Here, the "powder form" is a powder form in which the hydrophobically modified cellulose fibers are aggregated, and does not mean the cellulose particles.

The hydrophobically modified cellulose fibers in a powder form include, for example, a dried product obtained by directly drying a dispersion of the above-mentioned cellulose fibers; a powdered product obtained by a mechanical treatment of the dried product; a powdered product obtained by powdering a dispersion of the above-mentioned cellulose fibers according to a known spray-drying method; a powdered product obtained by powdering a dispersion of the above-mentioned cellulose fibers according to a known freeze-drying method; and the like. The above spray-drying method is a method including spraying the above-mentioned dispersion of cellulose fibers in the air, and drying the dispersion.

The average fiber diameter of the fine cellulose fibers obtained is preferably 0.1 nm or more, more preferably 0.5 nm or more, even more preferably 1 nm or more, even more preferably 2 nm or more, and still even more preferably 3 nm or more, from the viewpoint of the slippery surface properties and the inhibition of the migration of the oil to the fluid. In addition, the average fiber diameter is preferably 100 nm or less, more preferably 50 nm or less, even more preferably 20 nm or less, even more preferably 10 nm or less, even more preferably 6 nm or less, and still even more preferably 5 nm or less, from the same viewpoint.

The length of the fine cellulose fibers (average fiber length) obtained is preferably 150 nm or more, and more preferably 200 nm or more, from the viewpoint of the slippery surface properties and the inhibition of the migration of the oil to the fluid. In addition, the average fiber length is preferably 1,000 nm or less, more preferably 750 nm or less, even more preferably 500 nm or less, and even more preferably 400 nm or less, from the same viewpoint.

Here, in the present invention, the average fiber diameter and the average fiber length of the cellulose fibers are not limited to the ranges mentioned above, and, for example, those even in the orders of micrometers can be used.

In addition, the average aspect ratio of the fine cellulose fibers obtained, fiber length/fiber diameter, is preferably 1 or more, more preferably 10 or more, even more preferably 20 or more, even more preferably 40 or more, and even more preferably 50 or more, from the viewpoint of the slippery surface properties and the inhibition of the migration of the oil to the fluid, and preferably 150 or less, more preferably 140 or less, even more preferably 130 or less, even more preferably 100 or less, even more preferably 95 or less, and even more preferably 90 or less, from the same viewpoint. In addition, when the average aspect ratio is within the range mentioned above, the standard deviation of the aspect ratio is preferably 60 or less, more preferably 50 or less, and even more preferably 45 or less, from the viewpoint of the slippery surface properties and the inhibition of the migration of the oil to the fluid, and the lower limit is, but not particularly set to, preferably 4 or more, from the viewpoint of economic advantages. The fine cellulose fibers having a low aspect ratio mentioned above not only has excellent heat resistance but also has excellent dispersibility in the resin composition, so that a resin composition having high mechanical strength and being less likely to undergo brittle fracture is obtained.

<Oil Having SP Value of 10 or Less>

In the present invention, an oil having an SP value as defined above of 10 or less is used as a lubrication oil constituting a film.

The SP value as used herein refers to a solubility parameter (unit: $(cal/cm^3)^{1/2}$), calculated by Fedors method, which is described, for example, in Referential Publication "SP Chi Kiso-Ouyo to Keisan Hoho (SP Values Basics and Applications and Method of Calculation)" (JOHOKIKO CO., LTD., 2005); Polymer Handbook Third Edition (A Wiley-Interscience Publication, 1989), or the like.

The mass-average molecular weight of the oil having an SP value of 10 or less is not particularly limited, and the mass-average molecular weight is preferably 100 or more, and preferably 100,000 or less, more preferably 50,000 or less, and even more preferably 20,000 or less.

The amount of the oil having an SP value of 10 or less in the film of the present invention is, but not particularly limited to, preferably 50% by mass or more, more preferably 55% by mass or more, and even more preferably 60% by mass or more, from the viewpoint of the migration properties of the oil and the durability of the film. In addition, the amount of the oil is preferably 98% by mass or less, more preferably 97% by mass or less, and even more preferably 96% by mass or less, from the same viewpoint. When the oils having an SP value of 10 or less are two or more kinds, the amounts of the oils having an SP value of 10 or less are a total amount of each oil.

The mass ratio of the cellulose fibers in the hydrophobically modified cellulose fibers to the oil having an SP value of 10 or less in the film of the present invention, cellulose fibers:oil having an SP value of 10 or less, is, but not particularly limited to, preferably 1:1 or more, more preferably 1:2 or more, and even more preferably 1:3 or more, from the viewpoint of exhibiting the slippery surface properties mentioned below. In addition, the mass ratio is preferably 1:100 or less, more preferably 1:50 or less, and even more preferably 1:20 or less, from the viewpoint of the durability of the film. Here, the amount of the cellulose fibers in the hydrophobically modified cellulose fibers, as the conversion amount, can be obtained in accordance with a method described in Examples set forth below.

The oil having an SP value of 10 or less usable in the present invention includes, for example, oleic acid (SP value: 9.2), D-limonene (SP value: 9.4), PEG400 (SP value: 9.4), dimethyl succinate (SP value: 9.9), neopentyl glycol dicaprate (SP value: 8.9), hexyl laurate (SP value: 8.6), isopropyl laurate (SP value: 8.5), isopropyl myristate (SP value: 8.5), isopropyl palmitate (SP value: 8.5), isopropyl oleate (SP value: 8.6), hexadecane (SP value: 8.0), olive oil (SP value: 9.3), jojoba oil (SP value: 8.6), squalane (SP value: 7.9), liquid paraffin (SP value: 7.9), Fluorinert FC-40 (manufactured by 3M, SP value: 6.1), Fluorinert FC-43 (manufactured by 3M, SP value: 6.1), Fluorinert FC-72 (manufactured by 3M, SP value: 6.1), Fluorinert FC-770 (manufactured by 3M, SP value: 6.1), KF96-1cs (manufactured by Shin-Etsu Chemical Co., Ltd., SP value: 7.3), KF-96-10cs (manufactured by Shin-Etsu Chemical Co., Ltd., SP value: 7.3), KF-96-50cs (manufactured by Shin-Etsu Chemical Co., Ltd., SP value: 7.3), KF-96-100cs (manufactured by Shin-Etsu Chemical Co., Ltd., SP value: 7.3), KF-96-1000cs (manufactured by Shin-Etsu Chemical Co., Ltd., SP value: 7.3), and the like. Among them, the SP value of the oil is preferably 9.5 or less, more preferably 9.0 or less, and even more preferably 8.5 or less, from the viewpoint of the slippery surface properties and the inhibition of the migration of the oil to the fluid.

<Polymer Compound>

It is preferable that the film of the present invention contains a polymer compound, in addition to the components mentioned above, from the viewpoint of the inhibition of the migration of the oil having an SP value of 10 or less to the fluid and the durability of the film.

The polymer compound constituting the film of the present invention is one or more polymer compounds selected from the group consisting of the following (X) and (Y):

(X) polycondensation-based polymers having an ester group, an amide group, an urethane group, an imino group, an ether group, or a carbonate group; and (Y) methacrylic or acrylic polymers having in the side chain an ester group or an amide group.

The polymer compound of (X) is preferred, from the viewpoint of the inhibition of the migration of the oil having an SP value of 10 or less to the fluid and the durability of the film.

It is preferable that the above polymer compound contains a polymer component having a molecular weight of 100,000 or more, from the viewpoint of the migration properties of the oil having an SP value of 10 or less and the durability of the film. The amount of the component of the polymer component as described above in the polymer compound is preferably 1% by mass or more, more preferably 5% by mass or more, even more preferably 10% by mass or more, and even more preferably 15% by mass or more, from the same viewpoint, and the amount is preferably 50% by mass or less, more preferably 45% by mass or less, even more preferably 40% by mass or less, and even more preferably 35% by mass or less, from the same viewpoint. The mass-average molecular weight of the polymer compound and the amount of the component of the polymer component having a molecular weight of 100,000 or more in the polymer compound can be measured in accordance with the methods described in Examples set forth below.

The mass-average molecular weight of the above polymer compound is preferably 1,000 or more, from the viewpoint of the migration properties of the oil having an SP value of 10 or less and the durability of the film, and the mass-average molecular weight is preferably 500,000 or less, from the same viewpoint.

The polycondensation-based polymer (X) having an ester group includes condensates of dicarboxylic acids such as adipic acid, sebacic acid, dodecandionic acid, phthalic acid, isophthalic acid, terephthalic acid, succinic acid, and alkenylsuccinic acids, and diols such as ethylene glycol, propylene glycol, and butanediol, and the like.

The polycondensation-based polymer (X) having an amide group includes condensates of dicarboxylic acids such as adipic acid, sebacic acid, dodecandionic acid, phthalic acid, isophthalic acid, terephthalic acid, succinic acid, and alkenylsuccinic acids, and aliphatic diamines such as ethylenediamine, hexamethylenediamine, and propylenediamine, and the like.

The polycondensation-based polymer (X) having an urethane group includes condensates of diisocyanates such as tolyledine diisocyanate, diphenyl isocyanate, xylylene diisocyanate, and hexamethylene diisocyanate, and diols such as ethylene glycol, propylene glycol, and butanediol, and the like.

The polycondensation-based polymer (X) having an imino group includes condensates of alkylimines such as ethyleneimine, propyleneimine, butyleneimine, dimethylethyleneimine, pentyleneimine, and hexyleneimine; melamine-formamide condensates, and the like.

The polycondensation-based polymer (X) having an ether group includes condensates of alkylene oxides such as ethylene oxide, propylene oxide, and butylene oxide; condensates of epichlorohydrin and bisphenol A; condensates of formaldehydes, and the like.

The polycondensation-based polymer (X) having a carbonate group includes condensates of polyols such as 2,2-bis(4-hydroxyphenyl)propane, 2,2-bis(4-hydroxyphenyl)butane, and 1,1-bis(4-hydroxyphenyl)cyclohexane, and phosgene, and the like.

It is preferable that the polycondensation-based polymer (X) further contains a trifunctional or higher polyfunctional monomer, from the viewpoint of the migration properties of the oil having an SP value of 10 or less and the durability of the film.

The trifunctional or higher polyfunctional monomer includes trifunctional or higher polyfunctional amines such as diethylenetriamine, triethylenetetramine, tetraethylenepentamine, pentaethylenehexamine, di(methylethylene)triamine, dibutylenetriamine, tributylenetetramine, and pentapentylenehexamine; trifunctional or higher polyfunctional alcohols such as trimethylol, trimethylolpropane, glycerol, pentaerythritol, and ditrimethylolpropane; and trifunctional or higher polyfunctional carboxylic acids, such as trimellitic acid, benzophenone tetracarboxylic acid, trimellitic anhydride, pyromellitic acid, pyromellitic anhydride, benzophenone tetracarboxylic anhydride, trimesic acid, ethylene glycol bis(anhydrotrimellitate), and glycerol tris(anhydrotrimellitate). Preferred are trifunctional or higher polyfunctional amines such as diethylenetriamine, triethylenetetramine, tetraethylenepentamine, pentaethylenehexamine, di(methylethylene)triamine, dibutylenetriamine, tributylenetetramine, and pentapentylenehexamine, from the viewpoint of the migration properties of the oil having an SP value of 10 or less and the durability of the film.

Since the polycondensation-based polymer (X) further contains a trifunctional or higher polyfunctional monomer as a constituting unit, a crosslinking point is formed. By forming the crosslinking point, it is considered that the migration properties of the oil having an SP value of 10 or less and the durability of the film are improved.

The content ratio of the trifunctional or higher polyfunctional monomer in the polycondensation-based polymer (X) is preferably 0.2% by mol or more, more preferably 0.5% by mol or more, and even more preferably 2.5% by mol or more, from the viewpoint of the migration properties of the oil having an SP value of 10 or less and the durability of the film, and the content ratio is preferably 25% by mol or less, more preferably 20% by mol or less, and even more preferably 15% by mol or less, from the viewpoint of the migration properties of the oil having an SP value of 10 or less.

The polycondensation-based polymer (X) is preferably one or more polymer compounds selected from the group consisting of the following (a) and (b):

(a) polyamide compounds, and
(b) polyalkyleneimine compounds, from the viewpoint of the migration properties of the oil having an SP value of 10 or less and the durability of the film. The polyamide compounds of (a) are more preferred, from the viewpoint of the inhibition of the migration of the oil having an SP value of 10 or less to the fluid and the durability of the film.

(a) Polyamide Compounds

As the polyamide compound, a polyamide compound having any chemical structure can be used so long as it is a polymer compound not having a cellulose structure and having an amide bonding (—CONH—). The polyamide compound may be, for example, nylon composed of mainly an aliphatic backbone, or may be an aramide having mainly an aromatic backbone. Further, the polyamide compound may have a backbone structure other than the two mentioned above. On the other hand, the structure member suitably usable includes polyamides made from diamines and one or more carboxylic acids selected from the group consisting of monocarboxylic acids, dicarboxylic acids, and poly-aliphatic acids.

The mass-average molecular weight of the polyamide compound is preferably 5,000 or more, more preferably 10,000 or more, even more preferably 20,000 or more, and even more preferably 30,000 or more, from the viewpoint of the migration properties of the oil having an SP value of 10 or less and the durability of the film, and the mass-average molecular weight is preferably 500,000 or less, more preferably 250,000 or less, even more preferably 100,000 or less, and even more preferably 50,000 or less, from the same viewpoint.

The polyamide compound is usually obtained by an open-ring polymerization reaction of cyclic lactams, a self-condensation reaction of amino acids and derivatives thereof, and a polycondensation reaction of a carboxylic acid and an amine compound, or the like. The polyamide compound according to a polycondensation reaction of a carboxylic acid and an amine compound can be obtained by, for example, condensation (polycondensation) reaction of a carboxylic acid and an amine compound.

In the carboxylic acid, which is one of the raw materials of the polycondensation reaction, a monocarboxylic acid, a dicarboxylic acid, and a poly-aliphatic acid can be preferably used.

The monocarboxylic acid includes those which can serve as a polymerization arresting agent in the reaction of producing a polyamide compound, for example, acetic acid, propionic acid, butyric acid, valeric acid, lauric acid, palmitic acid, stearic acid, arachidic acid, behenic acid, and the like. Also, the unsaturated aliphatic monocarboxylic acid includes, for example, oleic acid, linoleic acid, linolenic acid, eicosenoic acid, erucic acid, mixed fatty acids (tall oil fatty acid, rice bran fatty acid, soybean fatty acid, beef tallow fatty acids, etc.) obtained from natural fats and oils, and the like. These monocarboxylic acids may be used alone or in a combination of two or more kinds.

The monocarboxylic acid usable in the present invention has preferably 8 or more carbon atoms and 24 or less carbon atoms, more preferably 10 or more carbon atoms and 22 or less carbon atoms, and even more preferably 12 or more carbon atoms and 18 or less carbon atoms, from the viewpoint of the migration properties of the oil having an SP value of 10 or less and the durability of the film.

The dicarboxylic acid includes, for example, adipic acid, sebacic acid, dodecandionic acid, phthalic acid, isophthalic acid, terephthalic acid, succinic acid, and alkenylsuccinic acids. As the alkenylsuccinic acid, one having an alkenyl group having preferably from 4 to 20 carbon atoms is preferred.

The poly-aliphatic acid refers to a polymer obtained by polymerizing monobasic aliphatic acids having an unsaturated bond, or a polymer obtained by polymerizing esterified products of a monobasic aliphatic acid having an unsaturated bond. The poly-aliphatic acid includes structure members obtainable by a dehydration condensation reaction of dimer acids derived from vegetable fats and oils.

As the monobasic aliphatic acid having an unsaturated bond, an unsaturated aliphatic acid having usually from one to three unsaturated bonds, the unsaturated aliphatic acid having a total number of carbon atoms of from 8 to 24 is usable. These unsaturated aliphatic acids include, for example, oleic acid, linoleic acid, linolenic acid, natural drying oil fatty acids, natural semi-drying, oil fatty acids, and the like. In addition, the ester of the monobasic aliphatic acid having an unsaturated bond includes esters of the above monobasic aliphatic acids having an unsaturated bond with aliphatic alcohols, and preferably esters with aliphatic alcohols having from 1 to 3 carbon atoms. The poly-aliphatic acid, which is a polymer obtainable by polymerizing the above monobasic aliphatic acids having an unsaturated bond or a polymer obtained by polymerizing esterified products of a monobasic aliphatic acid having an unsaturated bond, preferably contains a dimer as a main component. For example, as a polymer having an unsaturated aliphatic acid having 18 carbon atoms having the composition of from 0 to 10% by mass of a monobasic acid (monomer) having 18 carbon atoms, 60 to 99% by mass of a dibasic acid (dimer) having 36 carbon atoms, and 30% by mass or less of a tribasic or higher polybasic acid (trimer or higher polymer) having 54 carbon atoms can be obtained as a commercially available product.

Further, as the carboxylic acid component, in addition to the monocarboxylic acid, the dicarboxylic acid, and the poly-aliphatic acid, other carboxylic acids may be added, within the range that would not inhibit the physical properties of the film.

In these carboxylic acids, the combination of the monocarboxylic acid and the poly-aliphatic acid are especially preferably used. Here, the carboxylic acid may be an ester with an alcohol having from 1 to 3 carbon atoms.

In addition, other raw material amine compounds for the polycondensation reaction include polyamines, aminocarboxylic acids, amino alcohols, and the like. The polyamine includes aliphatic diamines such as ethylenediamine, hexamethylenediamine, and propylenediamine; polyalkylenepolyamines such as diethylenetriamine, triethylenetetramine, tetraethylenepentamine, pentaethylenehexamine, di(methylethylene)triamine, dibutylenetriamine, tributylenetetramine, and pentapentylenehexamine; aromatic diamines such as (ortho, para, or meta)xylenediamine and diphenylmethanediamine; and alicyclic diamines such as piperazine and isophoronediamine. The aminocarboxylic acid includes methylglycine, trimethylglycine, 6-aminocaproic acid, 6-aminocaprylic acid, ε-caprolactam, and the like. The amino alcohol includes ethanolamine, propanolamine, and the like.

In addition, as the amine compound, a monoamine can be used to serve as a polymerization arresting agent in the reaction of producing a polyamide compound.

Each compound used as these raw materials can be used alone or in a mixture of two or more kinds.

In addition, as the amine compound, preferably an amine component containing a polyamine, more preferably an amine component in which a diamine is used together with one or more members selected from the group consisting of triamine, tetramine, pentamine, and hexatetramine (defined as "Amine Component 1"); or an amine component containing two or more kinds of diamines (defined as "Amine Component 2") can be used, from the viewpoint of the migration properties of the oil having an SP value of 10 or less and the durability of the film. As the amine compound Amine Component 1 is more preferred, from the viewpoint of the sliding rate. The mass ratio when each of the components is used together in Amine Component 1, i.e. diamine:one or more members selected from the group consisting of triamine, tetramine, pentamine, and hexamine, is preferably from 99.5:0.5 to 50:50, more preferably from 99:1 to 60:40, and even more preferably from 95:5 to 70:30, from the viewpoint of the migration properties of the oil having an SP value of 10 or less and the durability of the film. The mass ratio when each of the components is used together in Amine Component 2, i.e. one diamine:the other diamine, is preferably from 99.5:0.5 to 50:50, more preferably from 99:1 to 60:40, and even more preferably from 95:5 to 64:36, from the viewpoint of the migration properties of the oil having an SP value of 10 or less and the durability of the film. The one diamine includes, for example, ethylenediamine, and the like, and the other diamine includes, for example, metaxylylenediamine, and the like.

(b) Polyalkyleneimine Compounds

The polyalkyleneimine compound refers to a compound of which main chain has a repeating unit comprising an alkylene group and an amino group, which is a polymer compound having a repeating unit having a structure of the following formula (A) and/or formula (B):

(A)

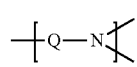
(B)

wherein in the above formula (A) and formula (B), Q is an alkylene group. Here, the alkylene group represented by Q includes an ethylene group, a propylene group, a butylene group, and the like. The alkylene group may be used alone or in two or more kinds. Among these, it is preferable that the alkylene group is an ethylene group. In other words, it is preferable that the polyalkyleneimine is polyethyleneimine.

The mass-average molecular weight of the polyalkyleneimine compound is preferably 1,000 or more, more preferably 2,000 or more, even more preferably 5,000 or more, and even more preferably 10,000 or more, from the viewpoint of the migration properties of the oil having an SP value of 10 or less and the durability of the film, and the mass-average molecular weight is preferably 200,000 or less, more preferably 100,000 or less, even more preferably 50,000 or less, and even more preferably 20,000 or less, from the same viewpoint.

The polymer (Y), i.e., a methacrylic or acrylic polymer having in its side chain an ester group or an amide group, includes, for example, polyalkyl (meth)acrylates, such as polymethyl (meth)acrylates, polyethyl (meth)acrylates, and polybutyl (meth)acrylates; poly(meth)acrylamides such as poly(meth)acrylamides, poly(N-methyl (meth)acrylamides), poly(N,N-dimethyl (meth)acrylamides), and poly(N-phenyl (meth)acrylamides), and the like.

When the film of the present invention contains a polymer compound, the amount of the polymer compound in the film is, but not particularly limited to, preferably 4% by mass or more, more preferably 8% by mass or more, and even more preferably 12% by mass or more, from the viewpoint of the migration properties of the oil having an SP value of 10 or less and the durability of the film, and the amount is preferably 30% by mass or less, more preferably 25% by mass or less, and even more preferably 20% by mass or less, from the same viewpoint. When there are two or more polymer compounds, the amount of the polymer compound is a total amount of each of the polymer compounds.

The film of the present invention may contain optional components without impairing the effects of the present invention. The content of these optional components in the film is preferably 0.1% by mass or more, more preferably 0.2% by mass or more, and even more preferably 0.5% by mass or more, and preferably 20% by mass or less, more preferably 15% by mass or less, and even more preferably 10% by mass or less. When there are two or more kinds of optional components, the amount of the optional components is a total amount of each of the components.

[Method for Forming Film on Molded Article]

The method for forming a film on a molded article comprises: step 1: preparing a dispersion containing hydrophobically modified cellulose fibers and an oil having an SP value of 10 or less, and step 2: applying the dispersion prepared in the step 1 to a molded article.

<Step 1>

The dispersion containing hydrophobically modified cellulose fibers and an oil having an SP value of 10 or less can be prepared by mixing these components and a solvent.

The solvent includes, for example, isopropyl alcohol, ethanol, methyl ethyl ketone, and the like.

The mixing conditions for these components are preferably from 15° to 35° C. Further, the mixing time is preferably from 10 to 60 minutes.

<Step 2>

The dispersion prepared in the step 1 is applied to a molded article having a solid surface made of glass, a resin, or the like. The method of application includes, for example, methods of applications using an applicator, a bar coder, a spin coater, or the like. The thickness of the coating film on the molded article is preferably 10 μm or more, more preferably 20 μm or more, and even more preferably 30 μm, from the viewpoint of the sliding rate and the durability, and the thickness is preferably 2,000 μm or less, more preferably 1,500 μm or less, and even more preferably 1,200 μm or less, from the viewpoint of applicability of the coating.

Next, a coating film is dried to provide a film. As the drying conditions, the treatment may be carried out under a reduced pressure or a normal pressure, and a temperature range of preferably from 15° to 75° C. In addition, the time for drying is preferably from 1 to 24 hours.

Thus, a film, and preferably a slippery surface film, is formed, and a molded article comprising a film is obtained.

[Molded Article]

The molded article comprising a film can be produced as mentioned above, and the molded article comprising a film as mentioned above is embraced by the present invention.

By applying a film of the present invention, and preferably a slippery surface film to a solid surface, the solid surface can be modified to a slippery surface. Therefore, the present invention embraces a film mentioned above for modifying a solid surface to a slippery surface. The film of the present invention has not only high effects of inhibiting the depositions of oily components, but also such effects can be maintained for a long period of time. Therefore, the film can be suitably used in various applications, for example, wrapping materials for daily sundries, cosmetics, and household electric appliances; package containers and food containers such as blistered packs and trays, and lids for lunch boxes; industrial trays used in transportation or protections of industrial parts; and the like.

[Dispersion for Film]

In one embodiment of the present invention, a dispersion for a film comprising hydrophobically modified cellulose fibers in which cellulose fibers are bound to a modifying group at one or more members selected from anionic groups and hydroxyl groups, and an oil having an SP value of 10 or less is provided. The dispersion for a film can be provided as a painting liquid for forming a film, and preferably a slippery surface film. The dispersion for a film may optionally contain solvents and other components listed in [Method for Forming Film on Molded Article] mentioned above.

The content of the hydrophobically modified cellulose fibers in the dispersion for a film is preferably 0.2% by mass or more, more preferably 0.3% by mass or more, and even more preferably 0.4% by mass or more, from the viewpoint of the inhibition of the migration of the oil having an SP value of 10 or less and the durability. In addition, the content is preferably 15% by mass or less, more preferably 10% by mass or less, and even more preferably 5% by mass or less, from the same viewpoint.

The content of the oil having an SP value of 10 or less in the dispersion for a film is preferably 4.0% by mass or more, more preferably 5.0% by mass or more, and even more preferably 6.0% by mass or more, from the viewpoint of the inhibition of the migration of the oil and the durability. In addition, the content is preferably 40% by mass or less, more preferably 20% by mass or less, and even more preferably 15% by mass or less, from the same viewpoint.

The content of the solvent in the dispersion for a film is preferably 80.0% by mass or more, more preferably 85.0% by mass or more, and even more preferably 88.0% by mass or more, from the viewpoint of sufficiently dispersing the hydrophobically modified cellulose fibers, and the like. In addition, the content is preferably 92.8% by mass or less, more preferably 91.7% by mass or less, and even more preferably 90.6% by mass or less, from the viewpoint of shortening the film formation time.

When the dispersion for a film contains a polymer compound, the content of the polymer compound in the dispersion for a film is preferably 0.8% by mass or more, more preferably 1.0% by mass or more, and even more preferably 1.2% by mass or more, from the viewpoint of the inhibition of the migration of the oil having an SP value of 10 or less and the durability. In addition, the content is preferably 3.0% by mass or less, more preferably 2.5% by mass or less, and even more preferably 2.0% by mass or less, from the same viewpoint.

The above dispersion may contain optional components that do not impair the effects of the present invention. The content of these optional components in the dispersion is preferably 0.1% by mass or more, more preferably 0.2% by mass or more, and even more preferably 0.5% by mass or more, and preferably 20% by mass or less, more preferably 15% by mass or less, and even more preferably 10% by mass or less. When there are two or more kinds of optional components, the amount of the optional components is a total amount of each of the optional components.

With respect to the above-mentioned embodiments, the present invention further discloses the following films, molded articles comprising the film, methods for forming a film on a molded article, and dispersions for a film.

<1> A Film Comprising
hydrophobically modified cellulose fibers in which cellulose fibers are bound to a modifying group at one or more members selected from anionic groups and hydroxyl groups, and
an oil having an SP value of 10 or less.

<2> The film according to <1>, wherein a preferred surface hardness of the film when measured with a microhardness meter, as Martens hardness (HM), is 0.1 (N/mm$^2$) or more.

<3> The film according to <1> or <2>, wherein the arithmetic means roughness of the film is preferably 0.3 μm or more, more preferably 0.5 μm or more, and even more preferably 0.8 μm or more, and preferably 40 μm or less, more preferably 35 μm or less, and even more preferably 30 μm or less.

<4> The film according to any one of <1> to <3>, wherein the thickness of the film is preferably 1 μm or more, more preferably 3 μm or more, and even more preferably 5 μm or more, and preferably 2,000 μm or less, more preferably 1,200 μm or less, even more preferably 500 μm or less, and even more preferably 100 μm or less.

<5> The film according to any one of <1> to <4>, wherein the sliding angle of the film is preferably 80° or less, more preferably 50° or less, and even more preferably 40° or less.

<6> The film according to any one of <1> to <5>, wherein the sliding rate of the film is preferably 1.5 cm/minute or more, more preferably 2.0 cm/minute or more, and even more preferably 2.5 cm/minute or more, and wherein the sliding rate at a fifth measurement is preferably 1.5 cm/minute or more, more preferably 2.0 cm/minute or more, and even more preferably 2.5 cm/minute or more.

<7> The film according to any one of <1> to <6>, wherein the migration ratio of the lubrication oil of the film is preferably 10.0% or less, more preferably 7.5% or less, even more preferably 5.0% or less, and even more preferably 0%.

<8> The film according to any one of <1> to <7>, wherein the hydrophobically modified cellulose fibers are cellulose fibers bound to a modifying group at one or more members selected from anionic groups and hydroxyl groups, preferably cellulose fibers bound to a modifying group at an anionic group or anionic groups, and more preferably an anionic group which is a carboxy group, wherein the cellulose fibers are bound to a modifying group at the carboxy group.

<9> The film according to any one of <1> to <8>, wherein the crystallinity of the hydrophobically modified cellulose fibers is preferably 10% or more, and preferably 90% or less.

<10> The film according to any one of <1> to <9>, wherein the preferred ranges for the average fiber diameter and the average fiber length of the hydrophobically modified cellulose fibers are the same as the preferred ranges for the average fiber diameter and the average fiber length of the fine cellulose fibers.

<11> The film according to any one of <1> to <10>, wherein the amount of the hydrophobically modified cellulose fibers in the film is preferably 1% by mass or more, more preferably 3% by mass or more, and even more preferably 4% by mass or more, and preferably 40% by mass or less, more preferably 35% by mass or less, and even more preferably 30% by mass or less.

<12> The film according to any one of <1> to <11>, wherein the hydrophobically modified cellulose fibers are preferably hydrophobically modified cellulose fibers (A) or hydrophobically modified cellulose fibers (B), more preferably hydrophobically modified cellulose fibers (A), and even more preferably hydrophobically modified cellulose fibers in which oxidized cellulose fibers are bound to a modifying group.

<13> The film according to any one of <1> to <12>, wherein the average binding amount of the modifying group in the hydrophobically modified cellulose fibers (A) is preferably 0.01 mmol/g or more, more preferably 0.05 mmol/g or more, even more preferably 0.1 mmol/g or more, even more preferably 0.3 mmol/g or more, and even more preferably 0.5 mmol/g or more, and preferably 3 mmol/g or less, more preferably 2.5 mmol/g or less, even more preferably 2 mmol/g or less, even more preferably 1.8 mmol/g or less, and even more preferably 1.5 mmol/g or less.

<14> The film according to any one of <1> to <13>, wherein the introduction ratio of the modifying group in the hydrophobically modified cellulose fibers (A) is preferably 10% or more, more preferably 30% or more, even more preferably 50% or more, even more preferably 60% or more, and even more preferably 70% or more, and preferably 99% or less, more preferably 97% or less, even more preferably 95% or less, and even more preferably 90% or less.

<15> The film according to any one of <1> to <14>, wherein the anionic group contained in the anionically modified cellulose fibers is preferably a carboxy group, a sulfonate group, and a phosphate group, and more preferably a carboxy group, and wherein the counterions of the anionic group in the anionically modified cellulose fibers are preferably sodium ions, potassium ions, calcium ions, aluminum ions, and protons.

<16> The film according to any one of <1> to <15>, wherein the content of the anionic group in the anionically modified cellulose fibers is preferably 0.1 mmol/g or more, more preferably 0.4 mmol/g or more, even more preferably 0.6 mmol/g or more, and even more preferably 0.8 mmol/<g or more, and preferably 3 mmol/g or less, more preferably 2 mmol/g or less, and even more preferably 1.8 mmol/g or less.

<17> The film according to any one of <1> to <16>, wherein the preferred ranges for the average fiber diameter and the average fiber length of the anionically modified cellulose fibers are the same as the preferred ranges for the average fiber diameter and the average fiber length of the fine cellulose fibers.

<18> The film according to any one of <1> to <17>, wherein the modifying group in the hydrophobically modified cellulose fibers (A) is preferably a hydrocarbon group, more preferably a hydrocarbon group such as a chained saturated hydrocarbon group, a chained unsaturated hydrocarbon group, a cyclic saturated hydrocarbon group, and an aromatic hydrocarbon group, and even more preferably a hydrocarbon group of which number of carbon atoms is preferably 1 or more, more preferably 2 or more, and even more preferably 3 or more, and preferably 30 or less, more preferably 24 or less, and even more preferably 18 or less.

<19> The film according to any one of <1> to <18>, wherein the number of carbon atoms in one of the modifying groups of the chained saturated hydrocarbon group is preferably 1 or more, more preferably 2 or more, even more preferably 3 or more, even more preferably 6 or more, and even more preferably 8 or more, and preferably 30 or less, more preferably 24 or less, even more preferably 18 or less, and even more preferably 16 or less.

<20> The film according to any one of <1> to <19>, wherein the chained saturated hydrocarbon group is preferably a methyl group, an ethyl group, a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl group, a docosyl group, or an octacosanyl group, and more preferably a propyl group, an isopropyl group, a butyl group, a sec-butyl group, a tert-butyl group, an isobutyl group, a pentyl group, a tert-pentyl group, an isopentyl group, a hexyl group, an isohexyl group, a heptyl group, an octyl group, a 2-ethylhexyl group, a nonyl group, a decyl group, a dodecyl group, a tridecyl group, a tetradecyl group, an octadecyl group, a docosyl group, or an octacosanyl group.

<21> The film according to any one of <1> to <20>, wherein the number of carbon atoms of the chained unsaturated hydrocarbon group is preferably 1 or more, more preferably 2 or more, and even more preferably 3 or more, and preferably 30 or less, more preferably 18 or less, even more preferably 12 or less, and even more preferably 8 or less.

<22> The film according to any one of <1> to <21>, wherein the chained unsaturated hydrocarbon group is preferably an ethylene group, a propylene group, a butene group, an isobutene group, an isoprene group, a pentene group, a hexene group, a heptene group, an octene group, a nonene group, a decene group, a dodecene group, a tridecene group, a tetradecene group, or an octadecene group, and more preferably an ethylene group, a propylene group, a butene group, an isobutene group, an isoprene group, a pentene group, a hexene group, a heptene group, an octene group, a nonene group, a decene group, or a dodecene group.

<23> The film according to any one of <1> to <22>, wherein the number of carbon atoms of the cyclic saturated hydrocarbon group is preferably 3 or more, more preferably 4 or more, and even more preferably 5 or more, and preferably 20 or less, more preferably 16 or less, even more preferably 12 or less, and even more preferably 8 or less.

<24> The film according to any one of <1> to <23>, wherein the cyclic saturated hydrocarbon group is preferably a cyclopropane group, a cyclobutyl group, a cyclopentane group, a cyclohexyl group, a cycloheptyl group, a cyclooctyl group, a cyclononyl group, a cyclodecyl group, a cyclododecyl group, a cyclotridecyl group, a cyclotetradecyl group, or a cyclooctadecyl group, and more preferably a cyclopropane group, a cyclobutyl group, a cyclopentane group, a cyclohexyl group, a cycloheptyl group, a cyclooctyl group, a cyclononyl group, a cyclodecyl group, or a cyclododecyl group.

<25> The film according to any one of <1> to <24>, wherein the aromatic hydrocarbon group is preferably selected from the group consisting of aryl groups and aralkyl groups, and wherein a total number of carbon atoms of the above aryl group is preferably 6 or more, and preferably 24 or less, more preferably 20 or less, even more preferably 14 or less, even more preferably 12 or less, and even more preferably 10 or less, and wherein a total number of carbon atoms of the above aralkyl group is preferably 7 or more, and more preferably 8 or more, and preferably 24 or less, more preferably 20 or less, even more preferably 14 or less, even more preferably 13 or less, and even more preferably 11 or less.

<26> The film according to any one of <1> to <25>, wherein the aryl group is preferably a phenyl group, a naphthyl group, an anthryl group, a phenanthryl group, a biphenyl group, a triphenyl group, a terphenyl group, and a group in which these groups are further substituted with a substituent, and more preferably a phenyl group, a biphenyl group, or a terphenyl group, and wherein the aralkyl group is preferably a benzyl group, a phenethyl group, a phenylpropyl group, a phenylpentyl group, a phenylhexyl group, a phenylheptyl group, a phenyloctyl group, or a group in which the aromatic group of these groups is further substituted with a substituent, and more preferably a benzyl group, a phenethyl group, a phenylpropyl group, a phenylpentyl group, a phenylhexyl group, or a phenylheptyl group.

<27> The film according to any one of <1> to <26>, wherein the number of carbon atoms of the primary to tertiary amines is preferably 1 or more, more preferably 2 or more, and even more preferably 3 or more, and preferably 20 or less, more preferably 18 or less, and even more preferably 16 or less, with proviso that an amino-modified silicone compound is excluded.

<28> The film according to any one of <1> to <27>, wherein the primary to tertiary amines are preferably ethylamine, diethylamine, triethylamine, propylamine, dipropylamine, butylamine, dibutylamine, hexylamine, dihexylamine, octylamine, dioctylamine, trioctylamine, dodecylamine, didodecylamine, stearylamine, distearylamine, monoethanolamine, diethanolamine, triethanolamine, aniline, and benzylamine, and an amino-modified silicone compound, and the like, and wherein the quaternary ammonium compound is preferably tetramethylammonium hydroxide (TMAH), tetraethylammonium hydroxide (TEAH), tetraethylammonium chloride, tetrapropylammonium hydroxide (TPAH), tetrabutylammonium hydroxide (TBAH), tetrabutylammonium chloride, lauryltrimethylammonium chloride, dilauryldimethyl chloride, stearyltrimethylammonium chloride, distearyldimethylammonium chloride, cetyltrimethylammonium chloride, or an alkylbenzyldimethylammonium chloride, more preferably propylamine, dipropylamine, butylamine, dibutylamine, hexylamine, dihexylamine, octylamine, dioctylamine, trioctylamine, dodecylamine, didodecylamine, distearylamine, an amino-modified silicone compound, tetraethylammonium hydroxide (TEAH), tetrabutylammonium hydroxide (TBAH), tetrapropylammonium hydroxide (TPAH), or aniline, even more preferably propylamine, dodecylamine, an amino-modified silicone compound, tetrabutylammonium hydroxide (TBAH), or aniline, and even more preferably an amino-modified silicone compound.

<29> The film according to any one of <1> to <28>, wherein the amino-modified silicone compound has a kinetic viscosity at 25° C. of preferably from 10 to 20,000 mm$^2$/s, more preferably from 200 to 10,000 mm$^2$/s, and even more preferably from 500 to 5,000 mm$^2$/s.

<30> The film according to any one of <1> to <29>, wherein the amino-modified silicone compound preferably has an amino equivalence of from 400 to 8,000 g/mol, more preferably from 400 to 8,000 g/mol, even more preferably from 600 to 5,000 g/mol, and even more preferably from 800 to 3,000 g/mol.

<31> The film according to any one of <1> to <30>, wherein the amino-modified silicone compound preferably is a compound represented by the general formula (a1):

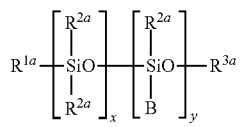

(a1)

wherein $R^{1a}$ is a group selected from an alkyl group having from 1 to 3 carbon atoms, a hydroxy group, an alkoxy group having from 1 to 3 carbon atoms, or a hydrogen atom, and from the viewpoint of the slippery surface properties and the inhibition of the migration of the oil to the fluid, preferred is a methyl group or a hydroxy group; $R^{2a}$ is a group selected from an alkyl group having from 1 to 3 carbon atoms, a hydroxy group, or a hydrogen atom, and from the viewpoint of the slippery surface properties and the inhibition of the migration of the oil to the fluid, preferred is a methyl group or a hydroxy group; B is a side chain having at least one amino group; $R^{1a}$ is an alkyl group having from 1 to 3 carbon atoms or a hydrogen atom; each of x and y is an average degree of polymerization, which is selected so that the kinetic viscosity at 25° C. and the amino equivalence of the compound fall within the range as defined above; here, each of $R^{1a}$, $R^{2a}$, and $R^{3a}$ may be identical or different, or plural $R^{2a}$'s may be identical or different.

<32> The film according to any one of <1> to <31>, wherein in the compound of the general formula (a1), from the viewpoint of the slippery surface properties and the inhibition of the migration of the oil to the fluid, x is preferably the number of from 10 to 10,000, more preferably the number of from 20 to 5,000, and even more preferably from 30 to 3,000, and y is preferably the number of from 1 to 1,000, more preferably the number of from 1 to 500, and even more preferably the number of from 1 to 200, and wherein the mass-average molecular weight of the compound of the general formula (a1) is preferably from 2,000 to 1,000,000, more preferably from 5,000 to 100,000, and even more preferably from 8,000 to 50,000.

<33> The film according, to any one of <1> to <32>, wherein the side chain B having an amino group or amino groups in the general formula (a1) is preferably the following ones:
—$C_3H_6$—$NH_2$,
—$C_3H_6$—NH—$C_2H_4$—$NH_2$,
—$C_3H_6$—NH—[$C_2H_4$—NH]$_e$—$C_2H_4$—$NH_2$,
—$C_3H_6$—$NH(CH_3)$,
—$C_3H_6$—NH—$C_2H_4$—$NH(CH_3)$,
—$C_3H_6$—NH[$C_2H_4$—NH]$_f$—$C_2H_4$—$NH(CH_3)$,
—$C_3H_6$—$N(CH_3)_2$,
—$C_3H_6$—$N(CH_3)$—$C_2H_4$—$N(CH_3)_2$,
—$C_3H_6$—$N(CH_3)$—[$C_2H_4$—$N(CH_3)$]$_g$—$C_2H_4$—$N(CH_3)_2$, and
—$C_3H_6$—NH-cyclo-$O_5H_{11}$,
wherein each of e, f, and g is the number of from 1 to 30.

<34> The film according to any one of <1> to <33>, wherein the preferred specific examples of the amino-modified silicone compounds are ones manufactured by Momentive Performance Materials, Inc., TSF4703. TSF4708, ones manufactured by Dow Corning-Toray Silicone Co., Ltd., SF8457C, SF8417, BY16-209, BY16-892, BY16-898, FZ-3760, ones manufactured by Shin-Etsu Chemical Co., Ltd., KF8002, KF867, KF-864, BY16-213, BY16-853U.

<35> The film according to any one of <1> to <34>, wherein the modifying group in the hydrophobically modified cellulose fibers (B) is preferably a hydrocarbon group which may have a substituent, wherein in the hydrocarbon which may have a substituent, the preferred hydrocarbon group is a saturated or unsaturated, linear or branched aliphatic hydrocarbon group, an aromatic hydrocarbon group such as a phenyl group, or an alicyclic hydrocarbon group such as a cyclohexyl group, and wherein a preferred substituent in the hydrocarbon group which may have a substituent is a halogen atom, an oxyalkylene group such as an oxyethylene group, and a hydroxyl group, and the like.

<36> The film according to any one of <1> to <35>, wherein the preferred embodiment of the hydrophobically modified cellulose fibers (B) is cellulose fibers bound to one or more substituents, via an ether bonding, selected from substituents represented by the following general formula (1) and general formula (2):

—$CH_2$—$CH(R_0)$—$R_1$     (1)

—$CH_2$—$CH(R_0)$—$CH_2$—$(OA)_n$—O—R     (2)

wherein $R_0$ is a hydrogen atom or a hydroxyl group; each of $R_1$ is independently a linear or branched alkyl having 3 or more carbon atoms and 30 or less carbon atoms; n is the number of 0 or more and 50 or less; and A is a linear or branched, divalent saturated hydrocarbon group having 1 or more carbon atoms and 6 or less carbon atoms, wherein the hydrophobically modified cellulose fibers have a cellulose I crystal structure.

<37> The film according to any one of <1> to <36>, wherein the more preferred embodiment of the hydrophobically modified cellulose fibers (B) is etherified cellulose fibers represented by the following general formula (4):

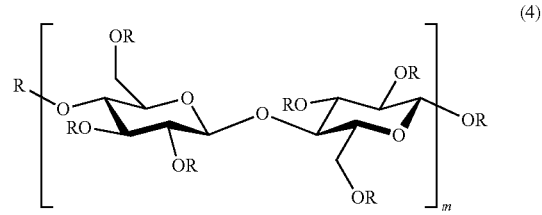

(4)

wherein R, each of which may be identical or different, is a hydrogen or a substituent selected from the substituents represented by the above general formula (1) and substituents represented by the above general formula (2); m is preferably an integer of 20 or more and 3,000 or less, with proviso that a case where all the R's are simultaneously hydrogen is excluded.

<38> The film according to any one of <1> to <37>, wherein the introduction ratio of the modifying group of the hydrophobically modified cellulose fibers (B) is preferably 0.0001 mol or more, and preferably 1.5 mol or less.

<39> The film according to any one of <1> to <38>, wherein the average fiber diameter of the fine cellulose fibers is preferably 0.1 nm or more, more preferably 0.5 nm or more, even more preferably 1 nm or more, even more preferably 2 nm or more, and even more preferably 3 nm or more, and preferably 100 nm or less, more preferably 50 nm or less, even more preferably 20 nm or less, even more preferably 10 nm or less, even more preferably 6 nm or less, and even more preferably 5 nm or less.

<40> The film according to any one of <1> to <39>, wherein the length of the fine cellulose fibers, an average fiber length, is preferably 150 nm or more, and more preferably 200 nm or more, and preferably 1,000 nm or less, more preferably 750 nm or less, even more preferably 500 nm or less, and even more preferably 400 nm or less.

<41> The film according to any one of <1> to <40>, wherein the mass-average molecular weight of the oil having an SP of 10 or less is preferably 100 or more, and preferably 100,000 or less, more preferably 50,000 or less, and even more preferably 20,000 or less.

<42> The film according to any one of <1> to <41>, wherein the amount of the oil having an SP of 10 or less is preferably 50% by mass or more, more preferably 55% by mass or more, and even more preferably 60% by mass or more, and preferably 98% by mass or less, more preferably 97% by mass or less, and even more preferably 96% by mass or less.

<43> The film according to any one of <1> to <42>, wherein the mass ratio of the cellulose fibers in the hydrophobically modified cellulose fibers to the oil having an SP value of 10 or less, the cellulose fibers:the oil having an SP value of 10 or less, is preferably 1:1 or more, more preferably 1:2 or more, and even more preferably 1:3 or more, and preferably 1:100 or less, more preferably 1:50 or less, and even more preferably 1:20 or less.

<44> The film according to any one of <1> to <43>, wherein the oil having an SP of 10 or less is preferably oleic acid, D-limonene, PEG400, dimethyl succinate, neopentyl glycol dicaprate, hexyl laurate, isopropyl laurate, isopropyl myristate, isopropyl palmitate, isopropyl oleate, hexadecane, olive oil, jojoba oil, squalane, liquid paraffin, Fluorinert FC-40, Fluorinert FC-43, Fluorinert FC-72, Fluorinert FC-770, KF96-1cs, KF-96-10cs, KF-96-50cs, KF-96-100cs, and KF-96-1000cs, and wherein the SP value of the oil is preferably 9.5 or less, more preferably 9.0 or less, and even more preferably 8.5 or less.

<45> The film according to any one of <1> to <44>, further containing a polymer compound, wherein the polymer compound is one or more polymer compounds selected from the group consisting of the following (X) and (Y):

(X) polycondensation-based polymers having an ester group, an amide group, an urethane group, an imino group, an ether group, or a carbonate group; and (Y) methacrylic or acrylic polymers having in the side chain an ester group or an amide group.

<46> The film according to any one of <1> to <45>, wherein the mass-average molecular weight of the polymer compound is preferably 1,000 or more, and preferably 500,000 or less.

<47> The film according to any one of <1> to <46>, wherein the amount of the polymer compound is preferably 4% by mass or more, more preferably 8% by mass or more, and even more preferably 12% by mass or more, and preferably 30% by mass or less, more preferably 25% by mass or less, and even more preferably 20% by mass or less.

<48> The film according to any one of <1> to <47>, wherein the content of the optional component is preferably 0.1% by mass or more, more preferably 0.2% by mass or more, and even more preferably 0.5% by mass or more, and preferably 20% by mass or less, more preferably 15% by mass or less, and even more preferably 10% by mass or less.

<49> A molded article comprising a film as defined in any one of the above <1> to <48>.

<50> A method for forming a film on a molded article, including step 1: preparing a dispersion containing hydrophobically modified cellulose fibers and an oil having an SP value of 10 or less, and step 2: applying the dispersion prepared in the step 1 to a molded article, wherein the dispersion is preferably prepared by mixing hydrophobically modified cellulose fibers, an oil having an SP value of 10 or less, and a solvent.

<51> The method for forming a film on a molded article according to <50>, wherein the solvent is preferably isopropyl alcohol, ethanol or methyl ethyl ketone.

<52> The method for forming a film on a molded article according to <50> or <51>, wherein the thickness of the dispersion (coating film) on the molded article is preferably 10 μm or more, more preferably 20 μm or more, and even more preferably 30 μm, and preferably 2,000 μm or less, more preferably 1,500 μm or less, and even more preferably 1,200 μm or less.

<53> A dispersion for a film, comprising hydrophobically modified cellulose fibers in which cellulose fibers are bound to a modifying group at one or more members selected from anionic groups and hydroxyl groups, and an oil having an SP value of 10 or less, wherein the content of the hydrophobically modified cellulose fibers in the dispersion for a film is preferably 0.2% by mass or more, more preferably 0.3% by mass or more, and even more preferably 0.4% by mass or more, and preferably 15% by mass or less, more preferably 10% by mass or less, and even more preferably 5% by mass or less.

<54> The dispersion for a film according to <53>, wherein the content of the oil having an SP of 10 or less is preferably 4.0% by mass or more, more preferably 5.0% by mass or more, and even more preferably 6.0% by mass or more, and preferably 40% by mass or less, more preferably 20% by mass or less, and even more preferably 15% by mass or less.

<55> The dispersion for a film according to <53> or <54>, wherein the content of the solvent is preferably 80.0% by mass or more, more preferably 85.0% by mass or more, and even more preferably 88.0% by mass or more, and preferably 92.8% by mass or less, more preferably 91.7% by mass or less, and even more preferably 90.6% by mass or less.

<56> The dispersion for a film according to any one of <53> to <55>, wherein the content of the polymer compound is preferably 0.8% by mass or more, more preferably 1.0% by mass or more, and even more preferably 1.2% by mass or more, and preferably 3.0% by mass or less more preferably 2.5% by mass or less, and even more preferably 2.0% by mass or less.

<57> The dispersion for a film according to any one of <53> to <56>, wherein the content of the optional component is preferably 0.1% by mass or more, more preferably 0.2% by mass or more, and even more preferably 0.5% by mass or more, and preferably 20% by mass or less, more preferably 1 5% by mass or less, and even more preferably 10% by mass or less.

EXAMPLES

The present invention will be described more specifically by means of the following Examples. Here, the Examples are mere exemplifications of the present invention, without intending to limit the present invention thereto. Parts in Examples are parts by mass unless specified otherwise. Here, "ambient pressure" means 101.3 kPa, and "room temperature" means 25° C.

[Average Fiber Diameter, Average Fiber Length, and Average Aspect Ratio of Anionically Modified Cellulose Fibers and Hydrophobically Modified Cellulose Fibers]

Water is added to subject cellulose fibers to provide a dispersion of which content is 0.0001% by mass. The dispersion is added dropwise to mica (mica), and dried to provide an observation sample. A fiber height of the subject cellulose fibers in the observation sample is measured with an atomic force microscope (AFM), Nanoscope III Tapping mode AFM, manufactured by Digital Instrument, a probe used being Point Probe (NCH) manufactured by NANOSENSORS. During that measurement. 100 or more sets of cellulose fibers are extracted from a microscopic image in which the cellulose fibers can be confirmed, and an average fiber diameter is calculated from the fiber heights of the fibers. An average fiber length is calculated from a distance in the direction of fibers. An average aspect ratio is calculated by an average fiber length/an average fiber diameter, and the standard deviation thereof is also calculated. Generally, a minimum unit of cellulose nanofibers prepared from higher plants is packed in nearly square form having sizes of 6×6 molecular chains, so that the height analyzed in the image according to the AFM can be assumed to be a width of the fibers.

[Average Fiber Diameter and Average Fiber Length of Raw Material Cellulose Fibers]

Ion-exchanged water is added to cellulose fibers to be measured, to provide a dispersion, a content of which is 0.01% by mass. The dispersion is measured with a wet-dispersion type image analysis particle counter manufactured by JASCO International Co., Ltd. under the trade name of IF-3200, under the conditions of a front lens: 2 folds, telecentric zoom lens: 1 fold, image resolution: 0.835 μm/pixel, syringe inner diameter: 6,515 μm, spacer thickness: 500 μm, image recognition mode: ghost, threshold value: 8, amount of analytical sample: 1 mL, and sampling: 15%. One hundred or more cellulose fibers are measured, an average ISO fiber diameter thereof is calculated as an average fiber diameter, and an average ISO fiber length is calculated as an average fiber length.

[Anionic Group Content of Anionic Group-Containing Cellulose Fibers and of Hydrophobically Modified Cellulose Fibers (A)]

Cellulose fibers to be measured with the mass of 0.5 g on a dry basis are placed in a 100 mL beaker, ion-exchanged water or a mixed solvent of methanol/water=2/1 is added thereto to make up a total volume of 55 mL. Five milliliters of a 0.01 M aqueous sodium chloride solution is added thereto to provide a dispersion, and the dispersion is stirred until the cellulose fibers to be measured are sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-710," under the conditions of a waiting time of 60 seconds. The values of electroconductivity and a pH are measured every minute, and the measurements are continued up to a pH of 11 or so to obtain an electroconductivity curve. A titrated amount of sodium hydroxide is obtained from this electroconductivity curve, and the content of the anionic group of the cellulose fibers to be measured is calculated in accordance with the following formula:

Anionic Group Content, mmol/g=Titrated Amount of Sodium Hydroxide×Aqueous Sodium Hydroxide Solution Concentration (0.05 M)/Mass of Cellulose Fibers to Be Measured (0.5 g)

[Aldehyde Group Content of Oxidized Cellulose Fibers and Hydrophobically Modified Cellulose Fibers]

To a beaker are added 100.0 g of cellulose fibers to be measured, a solid content of which is 1.0% by mass, an acetate buffer, pH 4.8, 0.33 g of 2-methyl-2-butene, and 0.45 g of sodium chlorite, and the contents are stirred at room temperature for 16 hours, to carry out an oxidation treatment of the aldehyde group. After the termination of the reaction, a cake obtained is washed with ion-exchanged water, to provide cellulose fibers to be measured of which aldehyde is subjected to an oxidization treatment. A liquid reaction mixture is subjected to a freeze-drying treatment, and a carboxy group content of a dried product obtained is measured in accordance with the method for measurement of the anionic group content described above, and a carboxy group content of the cellulose fibers to be measured which are subjected to an oxidization treatment is calculated. Subsequently, an aldehyde group content of the oxidized cellulose fibers or hydrophobically modified cellulose fibers is calculated according to the formula 1:

Aldehyde Group Content, mmol/g=(Carboxy Group Content of Oxidized Cellulose Fibers or Hydrophobically Modified Cellulose Fibers Which Are Subjected to Oxidization Treatment)−(Carboxy Group Content of Oxidized Cellulose Fibers or Hydrophobically Modified Cellulose Fibers) . . . formula 1

[Solid Content in Dispersion]

Using a halogen moisture balance MOC-120H manufactured by Shimadzu Corporation, measurements with a one-gram sample are taken in a thermostat held at 150° C. every 30 seconds, and a value at which a weight loss is 0.1% or less is defined as a solid content.

[Average Binding Amount and Introduction Ratio (Ionic Bonding) of Modifying Groups of Hydrophobically Modified Cellulose Fibers (A)]

The binding amount of the modifying group is obtained in accordance with the following IR determination method, and an average binding amount and an introduction ratio are calculated in accordance with the following formulas. The IR determination method is specifically taken by subjecting dried hydrophobically modified cellulose fibers (A) to a measurement according to ATR method with an infrared absorption spectrophotometer (IR) manufactured by Thermo Fisher Scientific K.K. under the trade name of Nicolet 6700, and a binding amount and an introduction ratio of the modifying group are calculated in accordance with the following formulas. The following is a case where the anionic group is a carboxy group. "Peak Intensity at 1720 $cm^{-1}$" mentioned below refers to a peak intensity ascribed to a carbonyl group. Here, in a case where an anionic group is other than the carboxy group, the average binding amount and the introduction ratio of the modifying group may be calculated by appropriately changing the value for a peak intensity.

Average Binding Amount of Modifying Group, mmol/g=[Carboxy Group Content of Cellulose Fibers Before Introduction of Modifying Group, mmol/g]×[(Peak Intensity at 1720 $cm^{-1}$ of Cellulose Fibers Before Introduction of Modifying Group)−(Peak Intensity at 1720 $cm^{-1}$ of Hydrophobically Modified Cellulose Fibers (A))÷Peak Intensity at 1720 cm$^{-1}$ of Cellulose Fibers Before Introduction of Modifying Group]

Peak Intensity at 1720 cm$^{-1}$: Peak intensity ascribed to a carbonyl group of the carboxylic acid Introduction Ratio of Modifying Group, %={Average Binding Amount of Modifying Group, mmol/g/Carboxy Group Content in Cellulose Fibers Before Introduction of Modifying Group, mmol/g}×100

[Average Binding Amount and Introduction Ratio (Amide Bonding) of Modifying Group of Hydrophobically Modified Cellulose Fibers (A)]

The average binding amount of the modifying group is calculated by the following formula. The following is a case where the anionic group is a carboxy group. Here, in a case where an anionic group is other than the carboxy group, the average binding amount and the introduction ratio of the modifying group may be calculated by replacing the carboxy group with the anionic group.

Average Binding Amount of Modifying Group, mmol/g=Carboxy Group Content in the Cellulose Fibers Before Introduction of Modifying Group, mmol/g−Carboxy Group Content in Cellulose Fibers After Introduction of Modifying Group, mmol/g Introduction Ratio of Modifying Group, %={Average Binding Amount of Modifying Group, mmol/g/Carboxy Group Content in Cellulose Fibers Before Introduction of Modifying Group, mmol/g}×100

[Introduction Ratio of Modifying Group in Hydrophobically Modified Cellulose Fibers (B)]

The % content, % by mass, of the modifying group contained in the etherified cellulose fibers obtained is calculated in accordance with Zeisel method, which is known as a method of analyzing an average number of moles added of alkoxy groups of the cellulose ethers described in *Analytical Chemistry*, 51(13), 2172 (1979), "Fifteenth Revised Japan Pharmacopeia (Section of Method of Analyzing Hydroxypropyl Cellulose)" or the like. The procedures are shown hereinbelow.

(i) To a 200 mL volumetric flask is added 0.1 g of n-octadecane and filled up to a marked line with hexane, to provide an internal standard solution.

(ii) One-hundred milligrams of etherified cellulose fibers previously purified and dried, and 100 mg of adipic acid are accurately weighed in a 10 mL vial jar, 2 mL of hydrogen iodide is added thereto, and the vial jar is tightly sealed.

(iii) The mixture in the above vial jar is heated with a block heater at 160° C. for 1 hour, while stirring with stirrer chips.

(iv) After heating, 3 mL of the internal standard solution and 3 mL of diethyl ether are sequentially injected to the vial, and a liquid mixture is stirred at room temperature for 1 minute.

(v) An upper layer (diethyl ether layer) of the mixture separated in two layers in the vial jar is analyzed by gas chromatography with "GC2010Plus," manufactured by SHIMADZU Corporation. The analytical conditions are as follows:

Column: DB-5, manufactured by Agilent Technologies, 12 m, 0.2 mm×0.33 μm

Column Temperature: 100° C., at 10° C./min, to 280° C., holding for 10 min

Injector Temperature: 300° C., detector temperature: 300° C., injection amount: 1 μL The content of the modifying groups in the etherified cellulose fibers, % by mass, is calculated from a detected amount of the compound for introducing modifying groups used.

From the content of the modifying groups obtained, the molar substitution (MS), which is an amount of moles of the modifying groups based on one mol of the anhydrous glucose unit, is calculated using the following math formula (1):

$$MS=(W1/Mw)/((100-W1)/162.14) \quad \text{(Math Formula 1)}$$

W1: The content of the modifying groups in the etherified cellulose fibers, % by mass Mw: The molecular weight of the compound for introducing modifying groups, g/mol

[Confirmation of Crystal Structure in Hydrophobically Modified Cellulose Fibers]

The crystal structure of the hydrophobically modified cellulose fibers is confirmed by measuring with an X-ray diffractometer manufactured by Rigaku Corporation under the trade name of "Rigaku RINT 2500VC X-RAY diffractometer."

The measurement conditions are: X-ray source: Cu/Kα-radiation, tube voltage: 40 kV, tube current: 120 mA, measurement range: diffraction angle 2θ=5° to 45°, and scanning speed of X-ray: 10°/min. A sample for the measurement is prepared by compressing pellets to a size having an area of 320 mm$^2$ and a thickness of 1 mm. Also, the crystallinity of the cellulose I crystal structure is calculated using X-ray diffraction intensity obtained based on the following formula (A):

$$\text{Cellulose I Crystallinity, \%}=[(122.6-118.5)/122.6]\times 100 \quad (A)$$

wherein 122.6 is a diffraction intensity of a lattice face (002 face)(angle of diffraction 2θ=22.6°), and 118.5 is a diffraction intensity of an amorphous portion (angle of diffraction 2θ=18.5°), in X-ray diffraction.

On the other hand, in a case where a crystallinity obtained by the above formula (A) is 35% or less, it is preferable to calculate the value based on the formula (B) given below, in accordance with the description of P199-200 of "*Mokushitsu Kagaku Jikken Manyuaru* (*Wood Science Experimental Manual*)," edited by The Japan Wood Research Society, from the viewpoint of improving the calculation accuracy.

Therefore, in a case where a crystallinity obtained by the above formula (A) is 35% or less, a calculated value based on the following formula (B) can be used as a crystallinity:

$$\text{Cellulose I Crystallinity (\%)}=[Ac/(Ac+Aa)]\times 100 \quad (B)$$

wherein Ac is a total sum of peak areas of a lattice face (002 face)(angle of diffraction 2θ=22.6°), a lattice face (011 face)(angle of diffraction 2θ=15.1°), and a lattice face (0-11 face)(angle of diffraction 2θ=16.2°), Aa is a peak area of an amorphous portion (angle of diffraction 2θ=18.5°), each peak area being calculated by fitting the X-ray diffraction chart obtained in a Gaussian function, in X-ray diffraction.

[Measurement of Arithmetic Mean Roughness of Film]

The arithmetic mean roughness of the film is measured as follows. The arithmetic mean roughness of the film is measured with a laser microscope manufactured by KEYENCE under the trade name of "VK-9710" under the following conditions. The measurement conditions are an objective lens: 10 folds, optical amount: 3%, lightness: 1548, and Z pitch: 0.5 μm. The arithmetic mean roughness of the film is determined at 5 points using an installed image processing software, and an average thereof is used.

[Cellulose Fibers (Conversion Amount) in Hydrophobically Modified Cellulose Fibers]

The cellulose fibers (conversion amount) in the hydrophobically modified cellulose fibers are measured by the following methods:

(1) In a Case where "a Compound for Introducing a Modifying Group" to be Added is One Kind The amount of the cellulose fibers (conversion amount) is calculated by the following formula A:

Amount of Cellulose Fibers (Conversion Amount), g=Mass of Hydrophobically Modified Cellulose Fibers, g/[1+Molecular Weight of Compound for Introducing Modifying Group, g/mol×Binding Amount of Modifying Group, mmol/g×0.001]   <Formula A>

(2) In a Case Where "Compounds for Introducing a Modifying Group" to be Added are Two or More Kinds The amount of the cellulose fibers (conversion amount) is calculated, taking a molar proportion of each of the compounds (i.e., a molar ratio when a total molar amount of the compounds to be added is defined as 1) into consideration.

Here, in a case where the bonding form of the cellulose fibers and a modifying group is an ionic bonding, in the formula A mentioned above, the phrase "Molecular Weight of Compound for Introducing Modifying Group" refers to "a molecular weight of an entirety of compounds for introducing modifying groups." On the other hand, in a case where the bonding form of the cellulose fibers and the compound for introducing a modifying group is an amide bonding, in the formula A mentioned above, the phrase "Molecular Weight of Compound for Introducing Modifying Group" refers to "a molecular weight of an entirety of compounds for introducing modifying groups minus 18 (-18)."

[Preparation of Dispersion of Cellulose Fibers]

Preparation Example 1—Dispersion of Oxidized Cellulose Fibers Obtained by Treating Natural Cellulose Fibers with N-Oxyl Compound Needle-leaf bleached kraft pulp manufactured by Fletcher Challenge Canada Ltd., under the trade name of "Machenzie," CSF 650 ml, was used as natural cellulose fibers. As TEMPO, a commercially available product manufactured by ALDRICH, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the needle-leaf bleached kraft pulp fibers were sufficiently stirred in 9,900 g of ion-exchanged water, and 1.25 g of TEMPO, 12.5 g of sodium bromide, and 28.4 g of sodium hypochlorite were added in that order to 100 g of the mass of the pulp. Using a pH stud titration, a 0.5 M sodium hydroxide was added dropwise to keep a pH at 10.5. After the reaction was carried out at 20° C. for 120 minutes, the dropwise addition of sodium hydroxide was stopped, to provide oxidized pulp. The oxidized pulp obtained was sufficiently washed with ion-exchanged water, and subsequently subjected to a dehydration treatment. Thereafter, 3.9 g of the oxidized pulp and 296.1 g of ion-exchanged water were subjected twice to a finely fibrillating treatment with a high-pressure homogenizer manufactured by Sugino Machine Limited, Starburstlabo HJP-2 5005 at 245 MPa, to provide a dispersion of oxidized cellulose fibers, a solid content of which was 1.3% by mass. These oxidized cellulose fibers had an average fiber diameter of 3.3 nm and a carboxy group content of 1.62 mmol/g.

Preparation Example 2—Dispersion of Oxidized Cellulose Fibers in Which Aldehyde Group Was Subjected to Reduction Treatment In a beaker, 3,846.15 g of a dispersion of oxidized cellulose fibers obtained in Preparation Example 1, a solid content of which was 1.3% by mass, was supplied, and a 1 M aqueous sodium hydroxide solution was added thereto, to adjust a pH of the dispersion to 10 or so, the beaker was then charged with 2.63 g of sodium borohydride manufactured by Wako Pure Chemical Industries, Ltd. (purity: 95% by mass), and the contents were allowed to react at room temperature for 3 hours to carry out an aldehyde reduction treatment. After the termination of the reaction, 405 g of a 1 M aqueous hydrochloric acid solution and 4,286 g of ion-exchanged water were added to the reaction mixture, to provide a 0.7% by mass aqueous solution, and the contents were allowed to react at room temperature for one hour to allow protonation. After the termination of the reaction, the reaction mixture was filtered, and a cake obtained was washed with ion-exchanged water to remove hydrochloric acid and salt. Finally, the washed mixture was subjected to solvent replacement with isopropyl alcohol, to provide a dispersion of oxidized cellulose fibers of which aldehyde group was subjected to a reduction treatment. The dispersion of oxidized cellulose fibers of which aldehyde group was subjected to a reduction treatment, a solid content of which was 2.0% by mass, obtained had an average fiber diameter of 3.3 nm and a carboxy group content of 1.62 mmol/g.

[Production of Hydrophobically Modified Cellulose Fibers]

Production Example 1

A beaker equipped with a magnetic stirrer and a stirring bar was charged with 300 g of a dispersion of oxidized cellulose fibers, a solid content of which was 2.0% by mass, obtained in Preparation Example 2. Subsequently, the beaker was charged with an amino-modified silicone "BY16-209" manufactured by Dow Corning-Toray Co., Ltd., simply referred to as "Silicone 1," in an amount corresponding to 0.5 mol of amino groups based on one mol of the carboxy groups of the oxidized cellulose fibers, and 100 g of isopropyl alcohol was added thereto. The mixture was allowed to react at room temperature, 25° C., for 14 hours. After the termination of the reaction, the reaction mixture was filtered, and a cake obtained was washed with isopropyl alcohol. Thereafter, the washed mixture was agitated with an ultrasonic homogenizer US-300E, manufactured by NIHON-SEIKI KAISHA, LTD. for 2 minutes. Thereafter, the agitated mixture was subjected to a finely fibrillating treatment with a high-pressure homogenizer manufactured by Sugino Machine Limited, Starburstlabo HJP-2 5005, under conditions at 100 MPa in one pass, and then at 150 MPa in nine passes, to provide hydrophobically modified cellulose fibers in which oxidized cellulose fibers were bound to an amino-modified silicone via an ionic bonding. The introduction ratio of the modifying group was 40% of the carboxy groups of the oxidized cellulose fibers. The hydrophobically modified cellulose fibers had an average fiber diameter of 3.3 nm and an average fiber length of 578 nm.

Production Examples 2 to 7

The same procedures as in Production Example 1 were carried out except for the points that the compound for introducing a modifying group and the amount charged were changed as shown in Table 1, to provide hydrophobically modified cellulose fibers. Here, the details of the compound for introducing a modifying group in Table 1 are as follows.

Silicone 2: SF8417, manufactured by Dow Corning-Toray Co., Ltd.

Silicone 3: FZ-3760, manufactured by Dow Corning-Toray Co., Ltd.

Dodecylamine: manufactured by Wako Pure Chemical Industries, Ltd.

Oleylamine: manufactured by Wako Pure Chemical Industries, Ltd.

Production Example 8

A beaker equipped with a magnetic stirrer and a stirring bar was charged with 300 g of a dispersion of hydrophobically modified cellulose fibers, a solid content of which was 1.2% by mass, obtained in Production Example 1. Subsequently, the beaker was charged with dodecylamine manufactured by Wako Pure Chemical Industries, Ltd. in an amount corresponding to 0.5 mol of amino groups based on one mol of the carboxy groups of the hydrophobically modified cellulose fibers, and 100 g of isopropyl alcohol was added thereto. The mixture was allowed to react at room temperature, 25° C., for 14 hours. After the termination of the reaction, the same procedures as in Production Example 1 were carried out, to provide hydrophobically modified cellulose fibers in which the amino-modified silicone and dodecylamine were bound via an ionic bonding.

SUNAMI with an applicator manufactured by TESTER SANGYO CO., LTD. so as to have a thickness of 100 μm, and dried at 50° C. under vacuum for 12 hours, to evaporate isopropyl alcohol, to provide a slippery surface film having a film thickness of 10 μm.

Examples 2 to 15

The same procedures as in Example 1 were carried out except for the points that the kinds of the hydrophobically modified cellulose fibers, the kinds of the oil having an SP value of 10 or less (lubrication oil), the mass ratio of the cellulose fibers to the lubrication oil, and the film thickness were changed as shown in Tables 3 and 4, to provide a slippery surface film.

[Production of Surface Film to Which Lubrication Oil was Applied]

Comparative Example 1

The same procedures as in Example 1 were carried out except for the point that squalane and isopropyl alcohol were used so that they were blended in a ratio of squalane, lubrication oil:isopropyl alcohol of 10:90, to provide a lubrication oil film having a film thickness of 10 μm. The results are shown in Table 3.

TABLE 1

| | Production Examples | | | | | | | |
|---|---|---|---|---|---|---|---|---|
| | 1 | 2 | 3 | 4 | 5 | 6 | 7 | 8 |
| Compound for Introducing Modifying Group | Silicone 1 | Silicone 1 | Silicone 1 | Silicone 2 | Silicone 3 | Dodecylamine | Oleylamine | Silicone 1 | Dodecylamine |
| Amount Charged | 0.5 | 0.25 | 1.0 | 0.5 | 0.5 | 1.0 | 1.0 | 0.5 | 0.5 |
| Introduction Ratio of Modifying Group, % | 40 | 20 | 90 | 40 | 40 | 90 | 90 | 40 | 40 |

The amount charged in Table 1 is an amount of amino groups, mol, based on one mol of carboxy groups.

[Production of Slippery Surface Film]

Example 1

Using hydrophobically modified cellulose fibers obtained in Production Example 1, a dispersion for a film was produced in the following manner to produce a slippery surface film. The hydrophobically modified cellulose fibers, squalane, and a solvent isopropyl alcohol were blended so that the cellulose fibers of the hydrophobically modified cellulose fibers:squalane, lubrication oil were adjusted to a mass ratio of 1:20, and the solvent was in an amount of 90% by mass of the entire dispersion, and the contents in the screw tube were agitated at room temperature for 30 minutes. Thereafter, the contents were further agitated at 2,200 rpm with a planetary centrifugal agitator "Awatori Rentaro" manufactured by THINKY CORPORATION for 2 minutes to defoam, to provide a dispersion for a coating film. A sample for a coating film obtained was applied to a glass substrate "Micro Slide Glass S2112" manufactured by MAT-

[Production of Surface Film to Which Lubrication Oil was Coated to Rugged Structure]

Comparative Example 2

To a glass substrate "Micro Slide Glass S2112" manufactured by MATSUNAMI was pasted a water-repellent sheet having a rugged structure "Toyal Ultra Lotus(registered trademark)" manufactured by Toyo Aluminum K.K. with a cellophane adhesive tape. Squalane was applied as a lubrication oil to a 75 cm$^2$-water-repellent sheet in an amount of 0.064 g, to produce a lubrication oil-coated surface film having a film thickness of 10 μm. The results are shown in Table 3.

[Production of Surface Film Using Oil Having SP Value Exceeding 10]

Comparative Example 3

The same procedures as in Example 8 were carried out except for the point that glycerol having an SP value of 16.5 was used in place of the lubrication oil squalane, to produce a surface film having a film thickness of 1,000 μm. The results are shown in Table 4.

[Performance Tests of Film]

The following tests were carried out at room temperature. The details of Fluid A used in the tests were as follows.

QUARTAMIN E-80K, manufactured by Kao Corporation: 3% by mass

Propylene glycol, manufactured by Wako Pure Chemical Industries, Ltd.: 1% by mass Ion-exchanged water: balance Test Example 1—Test for Measurement of Sliding Rate Fifty grams of Fluid A was placed on a film produced in each of Examples or Comparative Examples, and the film was slanted together with the glass substrate at an angle of 90°, to measure a distance in which Fluid A slid per minute.

Test Example 2—Test for Measurement of Migration Ratio of Lubrication Oil

Fluid A was applied to a film produced in each of Examples or Comparative Examples in an amount 100 times the mass of the lubrication oil in the film, and allowed to stand at room temperature in a petri dish. After 72 hours, Fluid A was sampled, and the migration properties of the lubrication oil from the film to Fluid A were evaluated. The migration properties were evaluated in terms of a migration ratio of the lubrication oil, % by mass, which was migrated into Fluid A that was sampled, sample, when the mass of the lubrication oil originally contained in the film was defined as 100. The measurements were made for squalane, isopropyl palmitate, jojoba oil, oleic acid, and glycerol in the sample using GC, and the measurement was made for silicone oil using NMR under the following conditions.

<GC Method>

In the following measurement method, the migration ratio was measured in accordance with a peak area ascribed to each lubrication oil detected at the time shown in Table 2.

TABLE 2

| | Kinds of Lubrication Oil | | | | |
|---|---|---|---|---|---|
| | Squalane | Isopropyl Palmitate | Jojoba Oil | Oleic Acid | Glycerol |
| Peak Time, min | 18.9 | 13.3 | 27.9 | 13.9 | 16.1 |

Apparatus: Agilent 6850 series II
Column: DB-5 (Agilent), 12 m×200 μm×0.33 μm
Method: Holding at 100° C. for 3 minutes, heating from 100° C. to 320° C. at 10° C./minute, and holding at 320° C. for 15 minutes
Detector: 330° C. (FID), $H_2$: 30 mL/minute, Air: 400 mL/minute, He: 30 mL/minute
Carrier gas: He
Injection amount: 1 μL
Sample: After sampling, a solution diluted with isopropyl alcohol 100 folds <NMR Method>

The migration ratio of the silicone oil was obtained using a peak intensity at 0 ppm ascribed to the silicone oil and a peak intensity ratio at 7.3 ppm ascribed to an internal standard 1,4-dibromobenzene.
Apparatus: Agilent-NMR-vnmr 400
Sample: 1% Deuterated chloroform solution (containing 0.06 wt % 1,4-dibromobenzene as an internal standard)
Integration count: 16 times Test Example 3—Test for Measurement of Sliding Angle Two microliters of liquid droplets (20° C.) of dodecane were added dropwise to a film at room temperature of 20° C., and allowed to stand for 10 seconds. Thereafter, the surface was slanted at rate of 1°/s to measure an angle at which the droplets started to flow. As a representative example, the sliding angle of the slippery surface film of Example 1 was 7°. In addition, the sliding angles of the surface films of Comparative Examples 1 and 2 were undeterminable.

The results are shown in the following Tables 3 and 4.

TABLE 3

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Hydrophobically Modified Cellulose Fibers | Compound for Introducing Modifying Group | Silicone 1 | Silicone 1 | Silicone 1 | Silicone 1 | Silicone 1 | Silicone 2 | Silicone 3 | Silicone 1 |
| | Average Binding Amount of Modifying Group, mmol/g | 0.7 | 0.7 | 0.7 | 0.4 | 1.4 | 0.7 | 0.7 | 0.7 |
| | Introduction Ratio of Modifying Group. % | 40 | 40 | 40 | 20 | 90 | 40 | 40 | 40 |
| Lubrication Oil | | Squalane | Squalane | Squalane | Squalane | Squalane | Squalane | Squalane | Squalane |
| Arithmetic Mean Roughness of Film, μm | | 1.0 | 1.1 | 1.5 | 1.6 | 1.3 | 1.2 | 1.0 | 2.3 |
| Film Thickness, μm | | 10 | 10 | 10 | 10 | 10 | 10 | 10 | 1.000 |
| Mass Ratio | | 1:20 | 1:10 | 1:3 | 1:20 | 1:20 | 1:20 | 1:20 | 1:20 |
| Sliding Rate, cm/min | | 4.8 | 3.7 | 2.4 | 2.9 | 4.7 | 4.6 | 4.3 | 15 |
| Migration Ratio of Lubrication Oil. % | | 5.2 | 1.2 | 0 | 4.5 | 4 | 3.5 | 2.7 | 5 |

| | | Ex. 9 | Ex. 10 | Ex. 11 | Comp. Ex. 1 | Comp. Ex. 2 |
|---|---|---|---|---|---|---|
| Hydrophobically Modified Cellulose Fibers | Compound for Introducing Modifying Group | Silicone 1 | Dodecylamine | Silicone 1 | Dodecylamine | — Substrate Material Rugged Structure |
| | Average Binding Amount of Modifying Group, mmol/g | 0.7 | 1.4 | 0.7 | 0.7 | — |
| | Introduction Ratio of Modifying Group. % | 40 | 90 | 40 | 40 | — |
| Lubrication Oil | | Silicone 100cs | Squalane | Squalane | Squalane Lubrication Oil | Squalane |

TABLE 3-continued

| | | | | | | | |
|---|---|---|---|---|---|---|---|
| Arithmetic Mean Roughness of Film, μm | 3.3 | 30 | 1.5 | Undeterminable | Film Thickness, μm | | 10 |
| Film Thickness, μm | 1.000 | 1.000 | 10 | 10 | | | |
| Mass Ratio | 1:20 | 1:20 | 1:20 | 0:20 | | | |
| Sliding Rate, cm/min | 11 | 12 | 6.2 | Undeterminable | Sliding Rate, cm/min | | 3.5 |
| Migration Ratio of Lubrication Oil. % | 5 | 4.5 | 1.3 | Undeterminable | Migration Ratio of Lubrication Oil. % | | 45 |

TABLE 4

| | | Comp. Ex. 3 | Ex. 12 | Ex. 13 | Ex. 14 | Ex. 15 |
|---|---|---|---|---|---|---|
| Hydrophobically Modified Cellulose Fibers | Compound for Introducing Modifying Group | Silicone 1 | Cellulose Fibers of Production Example 9 | Silicone 1 | Silicone 1 | Silicone 1 |
| | Average Binding Amount of Modifying Group, mmol/g | 0.7 | | 0.7 | 0.7 | 0.7 |
| | Introduction Ratio of Modifying Group. % | 40 | | 40 | 40 | 40 |
| Lubrication Oil | | Glycerol | Squalane | Isopropyl Palmitate | Jojoba Oil | Oleic Acid |
| Arithmetic Mean Roughness of Film, μm | | 2.8 | 5.1 | 1.8 | 4.4 | 10.5 |
| Film Thickness, μm | | 1.000 | 10 | 10 | 10 | 1.000 |
| Mass Ratio | | 1:20 | 1:20 | 1:20 | 1:20 | 1:20 |
| Sliding Rate, cm/min | | 0 | 2.1 | 3.8 | 1.8 | 2.0 |
| Migration Ratio of Lubrication Oil. % | | 5 | 5.5 | 0.9 | 2.0 | 10.7 |

In Tables 3 and 4, the roughness of the film refers to an arithmetic mean roughness of a slippery surface film.

The details of the lubrication oils used above are as follows:

Squalane, manufactured by Wako Pure Chemical Industries, Ltd., SP value: 7.9

Silicone 100 cs, manufactured by Shin-Etsu Chemical Co., Ltd., under the trade name of KF96-100cs, SP value: 7.3

Isopropyl Palmitate, manufactured by Wako Pure Chemical Industries, Ltd., SP value: 8.5

Jojoba Oil, manufactured by Wako Pure Chemical Industries, Ltd., SP value: 8.6

Oleic Acid, manufactured by Wako Pure Chemical Industries, Ltd., SP value: 9.2

Glycerol, manufactured by Wako Pure Chemical Industries, Ltd., SP value: 16.5

The followings could be seen from the above tables.

It could be seen that all of the surface films of Examples were excellent surface films having fast sliding rates, and small migration ratios of lubrication oil.

On the other hand, in Comparative Example 1 since the slippery surface itself could not be produced, the sliding rate, and the like could not be measured.

It could be seen that in the surface film of Comparative Example 2, in other words, a surface film containing a film having a conventional rugged structure containing an oil having an SP value of 10 or less, the migration ratio of the lubrication oil was incommensurably higher as compared to those of Examples, even though the surface film had favorable results in the sliding rate of the same level as Examples.

It could be seen that the film produced using the surface film of Comparative Example 3, in other words a film which was produced using glycerol, an oil having an SP value exceeding 10, had a sliding rate of 0 cm/minute, in other words, the effects of inhibiting the deposition of fluid were worsened.

[Production of Films]

Examples of 21 to 26 and Referential Example 1

Using the hydrophobically modified cellulose fibers obtained in Production Example 1 for Examples 21, 22, and 24 to 26 and Referential Example 1 and using the hydrophobically modified cellulose fibers obtained in Production Example 2 for Example 23, each of the dispersions for a film was prepared in the following manner, to produce a film. Specifically, hydrophobically modified cellulose fibers, a polymer compound, a lubrication oil squalane, and a solvent isopropanol were blended in a screw tube so that the solvent would make up 90% by mass of the entire dispersion, and the components would have a mass ratio as shown in Table 6. Next, the contents of the screw tube were agitated with a magnetic stirrer at a rotational speed of 500 rpm at room temperature of 25° C. for 12 hours. Thereafter, the contents were further agitated at 2,200 rpm with a planetary centrifugal agitator "Awatori Rentaro" manufactured by THINKY CORPORATION for 2 minutes to defoam, to provide a dispersion for a coating film. The dispersion for a coating film obtained was applied to a glass substrate "Micro Slide Glass S2112" manufactured by MATSUNAMI with an applicator manufactured by TESTER SANGYO CO., LTD. as a model molded article to provide a film having a thickness of 400 μm, and the film was dried at 50° C. under vacuum for 12 hours to evaporate isopropanol, to provide a film having a film thickness of 40 μm.

Method for Measurement of Molecular Weight of Polymer Compound

The mass-average molecular weight (Mw) was measured in accordance with gel permeation chromatography (GPC) using Hitachi L-6000 Model High-Performance Liquid Chromatography. A pump for an eluate flow path of Hitachi L-6000, a detector of SHODEX RI SE-61 differential refractive index detector, and a column of GMHHR-H connected in double were used. The sample was adjusted to a concentration of 0.5 g/100 mL with the eluate, and used in an amount of 20 μL. As the eluate, a chloroform solution of 1 mmol/L FARMIN DM20 manufactured by Kao Corporation was used. The measurement was carried out at a column temperature of 40° C. and a flow rate of 1.0 mL/minute. As the standard polymers for preparing a calibration curve, polystyrenes manufactured by TOSOH Corporation were used.

From the chart obtained by the GPC measurement, the amount of the component of the polymer component having a molecular weight of 100,000 or more in the polymer compound was calculated in accordance with the following formula:

Amount of Components Having Molecular Weights of 100,000 or More=(Area of Those Having Molecular Weights of 100,000 or More)/(Entire Area)

The details of the lubrication oil, the oil having an SP value of 10 or less, used above are as follows.

Squalane, manufactured by Wako Pure Chemical Industries, Ltd., SP value: 7.9

The details of the polymer compounds used above are as follows.

Polyamides 1 to 3: polyamides synthesized using raw materials in proportions shown in Table 5

Polyalkyleneimine: EPOMIN P-1000 manufactured by NIPPON SHOKUBAI CO., LTD.

Method for Synthesizing Polyamide 1

Four-hundred and fifty grams of HARIDIMER 250K was taken in a 2-L separable flask, and the contents were heated to 70° C., and then subjected to nitrogen replacement. Thereafter, 45 g of ethylenediamine and 5 g of diethylenetriamine were gradually added thereto, and after the addition, the contents were heated until an internal temperature reached 145° C. The contents were agitated at 145° C. for one hour, and heated until an internal temperature reached 210° C., and the contents were agitated for another 6 hours. Thereafter, while holding the internal temperature at 210° C., the contents were subjected to a pressure reduction with a vacuum pump to an internal pressure of 45 KPa, and the contents were agitated under a reduced pressure for 0.5 hours, to produce Polyamide 1.

Methods for Synthesizing Polyamides 2 and 3

As to Polyamides 2 and 3, the same procedures as in Polyamide 1 were carried out using raw materials shown in Table 5.

In Table 5, the content ratio of diethylenetriamine in Polyamide 1 was 3.0% by mol. Further, in Table 5, the amount of the polymer component refers to a proportion of the polymer components having a molecular weight of 100,000 or more that occupy the polymer compound.

The components of the raw materials used above are as follows.

HARIDIMER 250K, manufactured by Harima Chemicals, Inc.: Cas No. 61788-89-4: 100% (C36 Dimer acid)

Tsunodyme 205, manufactured by TSUNO FOOD INDUSTRIAL CO., LTD.: a mixture of Cas No. 61788-89-4:70% (C36 Dimer acid), Cas No. 68937-90-6:18% (TRILINOLEIC ACID) and Cas No. 68955-98-6: 12% (Fatty acids, c16-18 and c18-unsatd., branched and linear)

[Performance Tests of Films]

The following tests were conducted using Fluid A mentioned above.

Test Example A—Test for Measurement of Sliding Rate

A test was conducted in the same manner as in Test Example 1 mentioned above. This test was conducted five times. A first sliding rate and a fifth sliding rate are shown in Table 6.

Test Example B—Test for Migration Properties of Lubrication Oil

A test was conducted in the same manner as in Test Example 2 mentioned above to evaluate the migration properties. The results are shown in Table 6.

Test Example C—Test for Measurement of Sliding Angle

A test was conducted in the same manner as in Test Example 3 mentioned above to measure a sliding angle. As a representative example, a sliding angle of the film of Example 21 was 7°.

Test Example D—Test for Measurement of Hardness

With respect to each film, a surface hardness (Martens hardness) was measured with a hardness tester DUH-211,

TABLE 5

| | Polyamide 1 | | Polyamide 2 | | Polyamide 3 | | |
|---|---|---|---|---|---|---|---|
| | Raw Materials | % by Mass | Raw Materials | % by Mass | Raw Materials | % by Mass | Polyalkyleneimine |
| Carboxylic Acid | HARIDIMER 250K | 90 | HARIDIMER 250K | 83 | Tsunodyme 205 | 90 | — |
| Amine | Ethylenediamine | 9 | Ethylenediamine | 11 | Ethylenediamine | 9 | — |
| | Diethylenetriamine | 1 | Metaxylenediamine | 6 | Metaxylenediamine | 1 | — |
| Mass-Average Molecular Weight | 33,000 | | 19,000 | | 9,000 | | 15,000 |
| Amount of Polymer Component | 30% by Mass | | 10% by Mass | | 0% by Mass | | 10% by Mass | manufactured by Shimadzu Science Corporation, under the following conditions. The results are shown in Table 6.
Testing force: 0.1 mN
Load holding time: 5 (s)
Load-removal holding time: 1 (s)

TABLE 6

|  |  | Ex. 21 | Ex. 22 | Ex. 23 | Ex. 24 | Ex. 25 | Ex. 26 | Ref. Ex. 1 |
|---|---|---|---|---|---|---|---|---|
| Hydropho-bically Modified Cellulose Fibers | Compound for Introducing Modifying Group | Silicone 1 | Silicone 1 | Silicone 1 | Silicone 1 | Silicone 1 | Silicone 1 | Silicone 1 |
|  | Amount Charged, mol | 0.5 | 0.5 | 0.25 | 0.5 | 0.5 | 0.5 | 0.5 |
|  | Average Binding Amount of Modifying Group, mmol/g | 0.7 | 0.7 | 0.35 | 0.7 | 0.7 | 0.7 | 0.7 |
|  | Introduction Ratio of Modifying Group, % | 40 | 40 | 20 | 40 | 40 | 40 | 40 |
| Polymer Compound |  | Polyamide 1 | Polyamide 1 | Polyamide 1 | Polyamide 2 | Polyamide 3 | Polyalkylene-imine | Unadded |
| Lubrication Oil |  | Squalane | Squalane | Squalane | Squalane | Squalane | Squalane | Squalane |
| Arithmetic Mean Roughness of Film, μm |  | 1 | 0.8 | 0.8 | 1.2 | 1.5 | 1 | 1 |
| Film Thickness, μm |  | 40 | 40 | 40 | 40 | 40 | 40 | 40 |
| Mass Ratio |  | 5:15:100 | 33:33:100 | 5:15:100 | 5:15:100 | 5:15:100 | 5:15:100 | 5:0:100 |
| Sliding Rate, cm/min | First Run | 12 | 18 | 15 | 8.5 | 6.8 | 5 | 5 |
|  | Fifth Run | 10 | 18 | 15 | 5 | 2 | 3.5 | 0 |
| Migration Ratio of Lubrication Oil, % |  | 0 | 0 | 0 | 0 | 0 | 0 | 5 |
| Surface Hardness of Film, N/mm$^2$ |  | 4.3 | 13.6 | 6.1 | 3.8 | 2.3 | 2.4 | 2 |

In Table 6, the mass ratio refers to a ratio of "the cellulose fibers in the hydrophobically modified cellulose fibers: polymer compound:lubrication oil."

The followings could be seen from Table 6.

As compared to the film of Referential Example 1 in which a polymer compound was not contained, all of the films of each of Examples could be confirmed to have improved sliding rates, the lowered migration ratios of the oils having an SP value of 10 or less, and improved durability. Further, the tendencies could be confirmed that the larger the amount of the specified polymer compound, the larger the values of the surface hardness of the film.

INDUSTRIAL APPLICABILITY

Since the film of the present invention has high slippery surface properties, the film can be utilized in the fields of materials for packaging containers for cosmetics and foods.

The invention claimed is:
1. A film comprising
(i) hydrophobically modified cellulose fibers having at least one functional group selected from the group consisting of an anionic group, hydroxyl group and mixtures thereof, and in which the cellulose fibers are bound to a functional group having a structure excluding an amino group moiety from an amino modified silicone compound, and
(ii) an oil having an SP value of 10 or less.
2. The film according to claim 1, wherein the hydrophobically modified cellulose fibers have an anionic group bound to the modifying group.
3. The film according to claim 1, wherein the anionic group is a carboxy group.
4. The film according to claim 1, wherein the amount of the hydrophobically modified cellulose fibers in the film is 1% by mass or more and 40% by mass or less.
5. The film according to claim 1, wherein the amount of the oil having an SP of 10 or less is 50% by mass or more and 98% by mass or less.
6. The film according to claim 1, wherein the SP value of the oil is 9.5 or less.
7. The film according to claim 1, wherein a mass ratio of the cellulose fibers in the hydrophobically modified cellulose fibers to the oil having an SP value of 10 or less, the cellulose fibers: the oil having an SP value of 10 or less is from 1:1 to 1:100.
8. The film according to claim 1, wherein the surface hardness of the film when measured with a microhardness meter, as Martens hardness (HM), is 0.1 (N/mm$^2$) or more.
9. The film according to claim 1, wherein the arithmetic means roughness of the film is 0.3 μm or more and 40 μm or less.
10. A molded article comprising a film as defined in claim 1.
11. A method for forming a film on a molded article, comprising
step 1: preparing a dispersion comprising hydrophobically modified cellulose fibers, and an oil having an SP value of 10 or less, and
step 2: applying the dispersion prepared in the step 1 to a molded article;
wherein the hydrophobically modified cellulose fibers comprise cellulose fibers having at least one functional group selected from the group consisting of an anionic group, hydroxyl group and mixtures thereof, and in which the cellulose fibers are bound to a functional group having a structure excluding an amino group moiety from an amino modified silicone compound.
12. A dispersion for a film, comprising
hydrophobically modified cellulose fibers, and an oil having an SP value of 10 or less;
wherein the hydrophobically modified cellulose fibers comprise cellulose fibers having at least one functional group selected from the group consisting of an anionic group, hydroxyl group and mixtures thereof, and in which the cellulose fibers are bound to a functional group having a structure excluding an amino group moiety from an amino modified silicone compound.
13. The dispersion for a film according to claim 12, wherein the content of the oil having an SP of 10 or less is 4.0% by mass or more and 40% by mass or less.
14. The dispersion for a film according to claim 12, wherein the content of the hydrophobically modified cellu- lose fibers in the dispersion for a film is 0.2% by mass or more and 15% by mass or less.

15. The film according to claim 1, wherein the film is a slippery surface film, and wherein a sliding angle in the slippery surface film is 80° or less.

* * * * *